(12) United States Patent
Poznanski et al.

(10) Patent No.: US 11,875,797 B2
(45) Date of Patent: Jan. 16, 2024

(54) SYSTEMS AND METHODS FOR SCRIPTED AUDIO PRODUCTION

(71) Applicant: Pozotron Inc., Bellevue, WA (US)

(72) Inventors: Jakub Poznanski, Kirkland, WA (US); Kostiantyn Hlushak, Dnipro (UA)

(73) Assignee: Pozotron Inc., Bellevue, WA (US)

( * ) Notice: Subject to any disclaimer, the term of this patent is extended or adjusted under 35 U.S.C. 154(b) by 121 days.

(21) Appl. No.: 17/355,023

(22) Filed: Jun. 22, 2021

(65) Prior Publication Data
US 2022/0028390 A1    Jan. 27, 2022

Related U.S. Application Data

(60) Provisional application No. 63/055,806, filed on Jul. 23, 2020.

(51) Int. Cl.
*G10L 15/26* (2006.01)
*G10L 15/08* (2006.01)
(Continued)

(52) U.S. Cl.
CPC .......... *G10L 15/26* (2013.01); *G06F 3/04842* (2013.01); *G10L 15/063* (2013.01);
(Continued)

(58) Field of Classification Search
CPC ......... G10L 15/26; G10L 15/04; G10L 15/19; G10L 15/187; G10L 15/063; G10L 15/083; G10L 2015/221; G06F 3/04842
See application file for complete search history.

(56) References Cited

U.S. PATENT DOCUMENTS 5,679,001 A    10/1997 Russell et al.
9,384,188 B1 *  7/2016 Levit ................. G10L 15/22
(Continued)

FOREIGN PATENT DOCUMENTS

EP     3 245 597       11/2017
WO     1998/014934 A1   4/1998
(Continued)

OTHER PUBLICATIONS

D. Povey et al., "The Kaldi Speech Recognition Toolkit," Proc. of ASRU, 2011, 4 pages.
(Continued)

*Primary Examiner* — Richemond Dorvil
*Assistant Examiner* — Nadira Sultana
(74) *Attorney, Agent, or Firm* — Jeremiah J. Baunach; VLP Law Group LLP

(57) ABSTRACT

A scripted audio production system in which the scripted audio production computerized process decreases production time by improving computerized processes and technological systems for pronunciation research and script preparation, narration, editing, proofing and mastering. The system enables the user to upload their manuscript and recorded audio of the narration of the manuscript to the system. The system then compares the recorded audio against previously uploaded manuscript and any mistakes or deviations from the manuscript are highlighted or otherwise indicated to the user. The system automatically pieces together the last-read audio into a clean file without the need for significant user interaction. The process may also be performed on the recorded audio by the narrator first uploading the audio and manuscript to the scripted audio production technology system.

48 Claims, 10 Drawing Sheets

(51) Int. Cl.
*G10L 15/19* (2013.01)
*G10L 15/187* (2013.01)
*G06F 3/04842* (2022.01)
*G10L 15/06* (2013.01)

(52) U.S. Cl.
CPC .......... *G10L 15/083* (2013.01); *G10L 15/187* (2013.01); *G10L 15/19* (2013.01)

(56) References Cited

U.S. PATENT DOCUMENTS

| | | | | |
|---|---|---|---|---|
| 11,694,710 | B2* | 7/2023 | Nesta | H04S 3/008 704/233 |
| 2005/0276570 | A1* | 12/2005 | Reed, Jr. | G06F 16/48 386/231 |
| 2010/0324904 | A1* | 12/2010 | Kurzweil | G10L 13/00 704/260 |
| 2012/0116979 | A1* | 5/2012 | Hatch | G06Q 30/08 705/80 |
| 2013/0130216 | A1* | 5/2013 | Morton | G09B 5/062 434/317 |
| 2017/0263268 | A1* | 9/2017 | Rumberg | G10L 25/21 |
| 2018/0253648 | A1* | 9/2018 | Kaskari | G06F 18/2413 |
| 2020/0243062 | A1* | 7/2020 | Scodary | H04M 3/493 |
| 2020/0293266 | A1* | 9/2020 | German | G10L 13/08 |
| 2021/0074294 | A1* | 3/2021 | Shellef | H04R 1/406 |
| 2021/0312905 | A1* | 10/2021 | Zhao | G10L 15/16 |

FOREIGN PATENT DOCUMENTS

| | | | | |
|---|---|---|---|---|
| WO | 2012/152290 | A1 | 11/2012 | |
| WO | WO-2012152290 | A1 * | 11/2012 | ............ G09B 11/00 |
| WO | WO-2017091763 | A1 * | 6/2017 | ........... G06N 3/0445 |

OTHER PUBLICATIONS

Yao, et al., "Speech emotion recognition using fusion of three multi-task learning-based classifiers: HSF-DNN, MS-CNN and LLD-RNN," Speech Communication, vol. 120, Jun. 1, 2020, pp. 11-19.
International Search Report and Written Opinion of PCT/US2021/042486, dated Oct. 21, 2021, 16 pages.
"Amazon.com Whispersync for Voice—Learn More: Kindle Store," 3 pages, last reviewed Jul. 20, 2020, https://www.amazon.com/Whispersync-for-Voice/b?ie=UTF8&node=12527156011.
Amodei, Dario, et al., "Deep Speech 2: End-to-End Speech Recognition in English and Mandarin," Dec. 8, 2015, 28 pages.
Avidan, Shai, et al., "Seam Carving for Content-Aware Image Resizing," 9 pages, Aug. 20, 2015.
Chan, William, et al., "Listen, Attend and Spell," Aug. 20, 2015, 16 pages.
Hannun, Awni, "Sequence ModelingWith CTC," https://distill.pub/2017/etc/, Stanford. University, Nov. 27, 2017, 23 pages.
Hannun, Awni, et al., "Deep Speech: Scaling up end-to-end speech recognition," Dec. 19, 2014, 12 pages.
Park, Daniel S., et al., "SpecAugment: A Simple Data Augmentation Method for Automatic Speech Recognition," Dec. 3, 2019, 6 pages.
Shen, Jonathan, et al., "Natural TTS Synthesis by Conditioning Wavenet on MEL Spectrogram, Predictions," Google Inc., and University of California Berkeley, Feb. 16, 2018, 5 pages.
Van Den Oord, Aaron, et al., "Wavenet: A Generative Model for Raw Audio," Sep. 19, 2016, 15 pages.
Wang, Yuxuan, et al., "Tacotron: Towards End-to-End Speech Synthesis," Apr. 6, 2017, 10 pages, Google, Inc.
Wikipedia, "Sequence Alignment," 16 pages, last reviewed Jul. 20, 2020, https://en.wikipedia.org/wiki/Sequence_alignment.
Zhang, Ying, et al., "Towards End-to-End Speech Recognition with Deep Convolutional Neural Networks," Jan. 10, 2017, 5 pages.

* cited by examiner

SYSTEMS AND METHODS FOR SCRIPTED AUDIO PRODUCTION

TECHNICAL FIELD

The technical field relates to scripted audio production and more particularly electronic systems and methods for scripted audio production.

BRIEF SUMMARY

Scripted audio production (e.g., audiobook production) is traditionally a very manual process. For example, it often takes about 6 hours of work to produce one hour of final audio for a team of experienced professionals. For people who are only starting, this ratio might be closer to 10:1 or even 15:1; and people have reached the limit of what can be improved using non-specialized tools. In its various embodiments, the scripted audio production system and methods described herein decreases this production time by improving computerized processes and technological systems for pronunciation research, script preparation, narration, editing, proofing and mastering.

Therefore, the systems and methods described herein for scripted audio production improve the functioning of computer or other hardware, such as by reducing the processing, storage, and/or data transmission resources needed to perform various tasks, thus enabling the tasks to be performed with less latency and/or preserving more of the conserved resources for use in performing other tasks or additional instances of the same task.

A method for scripted audio production may be summarized as including: electronically receiving a manuscript; electronically storing the manuscript; and for each portion of a plurality of portions of recorded audio of speech generated from reading of the manuscript by a narrator: electronically determining to which particular portion of the manuscript the portion of recorded audio corresponds; determining whether a discrepancy exists between the particular portion of the manuscript and the portion of the recorded audio based on the determination of which particular portion of the manuscript the portion of recorded audio corresponds; and electronically determining whether to perform an action based on the determination whether a discrepancy exists between the particular portion of the manuscript and the portion of the recorded audio. For example, the action may include flagging the discrepancy, providing a notification regarding the discrepancy and/or providing one or more options to the user to take an action regarding the discrepancy.

The method may further include: electronically receiving input indicating to initiate recording of the audio of speech generated from reading of the manuscript; and in response to the input, starting to electronically record the audio of speech, wherein: the determining which particular portion of the manuscript the portion of recorded audio corresponds may include: in response to starting to electronically record the audio of speech, while recording the audio of speech, electronically determining to which particular portion of the manuscript a portion of the audio currently being recorded corresponds, the determining whether a discrepancy exists between the particular portion of the manuscript and the portion of the recorded audio may include: while recording the audio of speech, automatically determining whether a discrepancy exists between the particular portion of the manuscript and the portion of the audio currently being recorded based on the determination of which particular portion of the manuscript a portion of the audio currently being recorded corresponds, and then electronically determining whether to perform an action based on the determination whether a discrepancy exists between the particular portion of the manuscript and the portion of the recorded audio may include: electronically determining whether to perform an action based on the automatic determination of whether a discrepancy exists between the particular portion of the manuscript and the portion of the audio currently being recorded.

The method may further include: while recording the audio of speech, in response to determining a discrepancy exists between the particular portion of the manuscript and the portion of the audio currently being recorded, automatically communicating an indication of the discrepancy to be visible by one reading the manuscript.

The action may be presenting an indication of the potential discrepancy (e.g., an annotation), and the method may further include: electronically presenting indications of discrepancies between the manuscript and corresponding portions of the recorded audio; electronically providing selectable options to record additional audio of speech generated from reading of the manuscript to correct the discrepancies; electronically receiving a selection of at least one of the selectable options identifying a specific portion of the recorded audio corresponding to a respective discrepancy between the specific portion and the manuscript; and in response to receiving the selection, enabling recording an additional portion of audio of speech to correct the respective discrepancy. The enabling recording of an additional portion of audio of speech to correct the respective discrepancy may include: in response to receiving the selection, before recording the additional portion of audio of speech to correct the respective discrepancy (also referred to as a "pickup") playing a pre-roll portion of the recorded audio that is before the specific portion of the recorded audio corresponding to the respective discrepancy.

The method may further include: automatically detecting in the recorded audio of speech individual portions of audio that represent portions of the manuscript that were repeated by a reader of the manuscript to correct a mistake in the reading of the manuscript; electronically selecting one of the individual portions of audio that represent portions of the manuscript that were repeated; and automatically generating an edited version of the recorded audio of speech generated from reading of the manuscript in which the selected individual portion replaces the other individual portions of audio that represent portions of the manuscript that were repeated.

The selecting one of the individual portions of audio may include automatically selecting a most recently recorded one of the individual portions of audio. The selecting one of the individual portions of audio may include: electronically presenting a menu of the individual portions from which a user may select; and receiving input indicative of a selection from the menu of one of the individual portions of audio as the selected individual portion. The determining whether a discrepancy exists between the particular portion of the manuscript and the portion of the recorded audio may include alignment of text of the manuscript and Connectionist Temporal Classification (CTC) logit arrays. Alignment can be made either A. between the text of the manuscript and the CTC logits, or B. between the text of the manuscript and the transcription of the audio recording. The determining whether a discrepancy exists between the particular portion of the manuscript and the portion of the recorded audio may further include comparing CTC logits directly to the manuscript. The determining whether a discrepancy exists between the particular portion of the manuscript and the portion of the recorded audio may include performing CTC Absolute Time Alignment with one or more of: root mean square (RMS) and Voice Activity Detector (VAD) detection loss. The determining whether a discrepancy exists between the particular portion of the manuscript and the portion of the recorded audio may also include performing another type of Automatic Speech Recognition method, which may include any number of the standardly available methods. The determining whether a discrepancy exists between the particular portion of the manuscript and the portion of the recorded audio may include performing document heuristics to remove extra text from the manuscript. The determining whether a discrepancy exists between the particular portion of the manuscript and the portion of the recorded audio may include performing fuzzy text alignment of text from the manuscript with text resulting from automatic speech recognition (ASR) of the recorded audio of speech generated from reading of the manuscript by the narrator. The determining whether a discrepancy exists between the particular portion of the manuscript and the portion of the recorded audio may include performing context aware CTC logit resizing for automatic speech recognition (ASR) ensembles. The determining whether a discrepancy exists between the particular portion of the manuscript and the portion of the recorded audio may include performing an alignment method to improve teacher-training of audio models. The determining whether a discrepancy exists between the particular portion of the manuscript and the portion of the recorded audio may include performing grapheme-to-phoneme pronunciation equivalence. The determining whether a discrepancy exists between the particular portion of the manuscript and the portion of the recorded audio may include performing normalization of any text in the manuscript or transcription of the recorded audio.

The method may further include: presenting a graphical user interface that combines a view of: an audio player that plays the recorded audio, the manuscript and an interface for entering and editing error notes all in a same user interface screen of a single scripted audio production application.

The method may further include: presenting a graphical user interface within a scripted audio production application that visually synchronizes text of the manuscript with corresponding portions of the recorded audio of speech generated from reading of the manuscript.

The method may further include: starting to record audio of speech generated from reading of the manuscript by the narrator; in response to starting to record the audio of the speech, automatically tracking a current point within the manuscript from where the narrator is currently reading while recording the audio generated from reading of the manuscript; and during the reading of the manuscript, automatically highlighting or otherwise indicating via a user interface discrepancies between a text of the manuscript and corresponding portions of the of speech generated from reading of the manuscript.

The method may further include: receiving input indicating selection via a graphical user interface of a word in the manuscript; and in response to receiving the input indicating the selection of the word, outputting for presentation via the graphical user interface a timestamp within the recorded audio corresponding to a recording of the word during reading of the manuscript.

The method may further include: pre-filling into an electronic document, as the recorded audio is being recorded, one or more of: timestamps within the recorded audio corresponding to locations within the manuscript and page numbers of the manuscript corresponding to the timestamps.

The method may further include: generating a report (which may also be referred to as a "pickup packet") automatically, including at least: automatically collecting, for a specific user, notes regarding the recorded audio of speech generated from reading of the manuscript; and generating, for the specific user, an electronic report with the text from the manuscript of the discrepancies between the particular portion of the manuscript and the portion of the audio, text of the notes included in the report, and also audio snippets from the recorded audio associated with each of the discrepancies for reference purposes.

The method may further include: receiving input from a first specific user tagging notes from the first specific user regarding the recorded audio of speech generated from reading of the manuscript to be directed to a second specific user associated with the recorded audio; and based on receiving the input, automatically generating for the second specific user, an electronic report with text of the tagged discrepancies between the particular portion of the manuscript and the portion of the audio and also audio snippets from the recorded audio associated with each of the tagged discrepancies for reference purposes.

The method may further include: electronically presenting, via a graphical user interface, a configuration form for pause editing and pacing of the recorded audio of speech generated from reading of the manuscript wherein the configuration form presents selectable options for a user to select durations for different possible punctuation and dialog settings for pauses and pacing; receiving input indicating selections via the configuration form of durations for different possible punctuation or dialog settings for pauses or pacing; and editing, based on the received input, pausing or pacing of the recorded audio.

The method may further include: electronically detecting and flagging non-speech sounds in the recorded audio for editing by a user within a scripted audio production application and a user interface to allow these non-speech sounds to be removed from/edited out of the recorded audio.

The method may further include: before the reading of the manuscript by the narrator: automatically extracting from the manuscript words detected to likely be mispronounced by the narrator during the reading of the manuscript; listing the detected words in a graphical user interface of a scripted audio production application; electronically consulting existing pronunciation dictionaries or other resources to collect information that helps identify proper pronunciation of the detected words; providing an electronic means for a user to record their own customized pronunciation of detected words; and electronically communicating to the narrator, via the graphical user interface or a separate electronic document, the collected information that helps identify proper pronunciation of the detected words.

The portion of the recorded audio may be an electronically recorded word from the speech generated from reading of the manuscript by the narrator and the particular portion of the manuscript is a word from the manuscript.

As shown above and in more detail throughout the present disclosure, the present disclosure provides technical improvements in computer networks to existing computerized systems for scripted audio production.

These and other features and advantages of the claimed disclosure will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 5 is a sample view of an example UI in a system for scripted audio production displaying discrepancies between a manuscript and a corresponding portion of recorded audio of speech generated from reading of the manuscript, according to various embodiments of the present disclosure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

In the following description, example networked and computing environments in which systems and methods for scripted audio production may be implemented and operate will be described first, followed by further implementation details.

Figure 1:
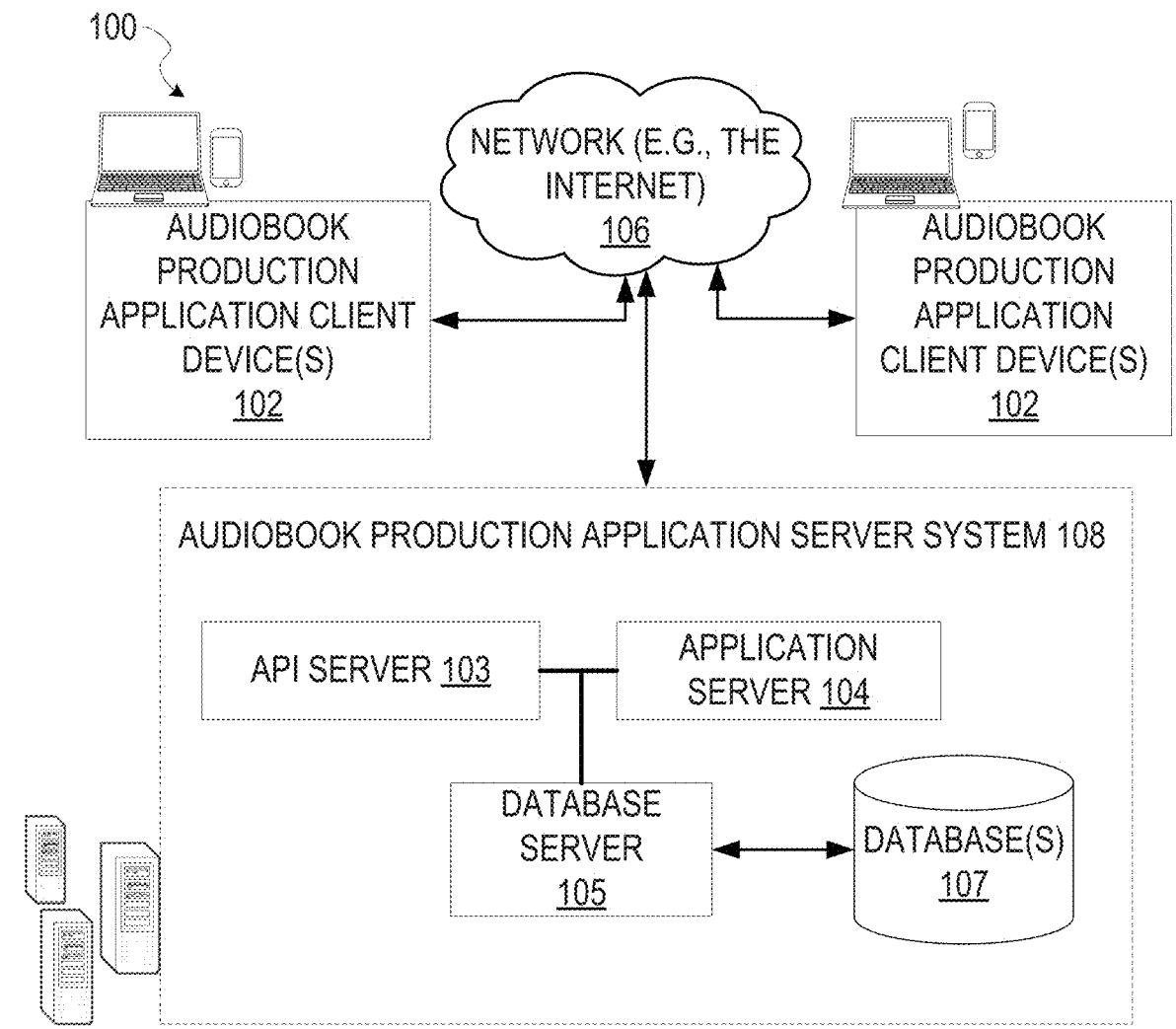
FIG. 1 is a diagram showing an example networked system for scripted audio production, according to various embodiments of the present disclosure.

FIG. 1 is a diagram showing an example networked system 100 for scripted audio production, according to various embodiments of the present disclosure. The system 100 is operable for exchanging data over a network. In this example, the system 100 includes multiple scripted audio production application client devices 102, each of which may host a number of applications. In this context, a "client device" may refer to any machine that interfaces to a communications network to obtain resources from one or more server systems or other client devices. A client device may be, but is not limited to, a mobile phone, a desktop computer, a laptop, a portable digital assistant (PDA), a smartphone, a tablet, a netbook, a multi-processor system, a microprocessor-based or programmable consumer electronics device, or any other communication device that a user may use to access a network.

Each client device 102 may communicate and exchange data with other client devices 102, as well as with audio production application server system 108 via the network 106. The server system 108 is a computer system. Such data may include functions (e.g., commands to invoke functions) as well as payload data (e.g., text, audio, video or other multimedia data). In this context, the network 106 may be, or include, one or more portions of a network such as an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation (5G) networks, Universal Mobile Telecommunications System (UMTS), High Speed Packet Access (HSPA), Worldwide Interoperability for Microwave Access (WiMAX), a Long Term Evolution (LTE) standard, others defined by various standard setting organizations, other long range protocols, or other data transfer technology.

The server system 108 provides server-side functionality via the network 106 to one or more client devices (102). While certain functions of the system 100 are described herein as being performed by either a client device 102 or by the server system 108, it will be appreciated that some functionality may be interchangeably performed by either the client device 102 or by the server system 108. For example, it may be technically preferable to initially deploy certain technology and functionality within the server system 108, but later migrate this technology and functionality to a client device 102 having sufficient processing/memory capacity. Additionally, some functionality of embodiments of the present disclosure may be distributed across a plurality of different processors and/or computing devices, including one or more client devices 102 and server systems 108.

The server system 108 supports various scripted audio production services and operations that are provided to the client devices 102. Such operations include transmitting data to, receiving data from, and processing data generated by the client device 102. This data may include, for example, manuscripts, recorded audio generated from reading of manuscripts, data regarding manuscripts, recorded audio and/or processing thereof, message content, client device information, geolocation information, database information, transaction data, and other information. Data exchanges within the system 100 are invoked and controlled through functions available via user interfaces (UIs) of the client devices 102.

In the example depicted in FIG. 1, system 108 includes an Application Programming Interface (API) server 103 that is coupled to, and provides a programmatic interface to, an application server 104. The API server 103 and application server 104 are communicatively coupled to a database server 105, which facilitates access to a database 107 including data that may be processed by the application server 104. In other embodiments, the functionality of the API server 103, application server 104, and database server 105 may be performed by more or fewer systems. In some embodiments, for example, server system 108 may comprise a single server having API functionality, application functionality, and database functionality.

In the example shown in FIG. 1, the API server 103 receives and transmits data (e.g., commands and message payloads) between the client device 102 and the server system 108. Specifically, the API server 103 provides a set of interfaces (e.g., routines and protocols) that can be called or queried by the one or more software applications running on a client device 102 in order to invoke functionality of the application server 104 or database server 105. The API server 103 exposes various functions supported by the application server 104, including account registration, login functionality, the sending of messages, search queries, and other functionality.

The application server 104 hosts a number of applications and subsystems. For example, the application server 104 may implement a variety of message processing technologies and functions, including various data-processing operations, with respect to data received within the payload of a message received from one or more client devices 102, or retrieved from one or more databases 107 by database server 105.

Figure 2:
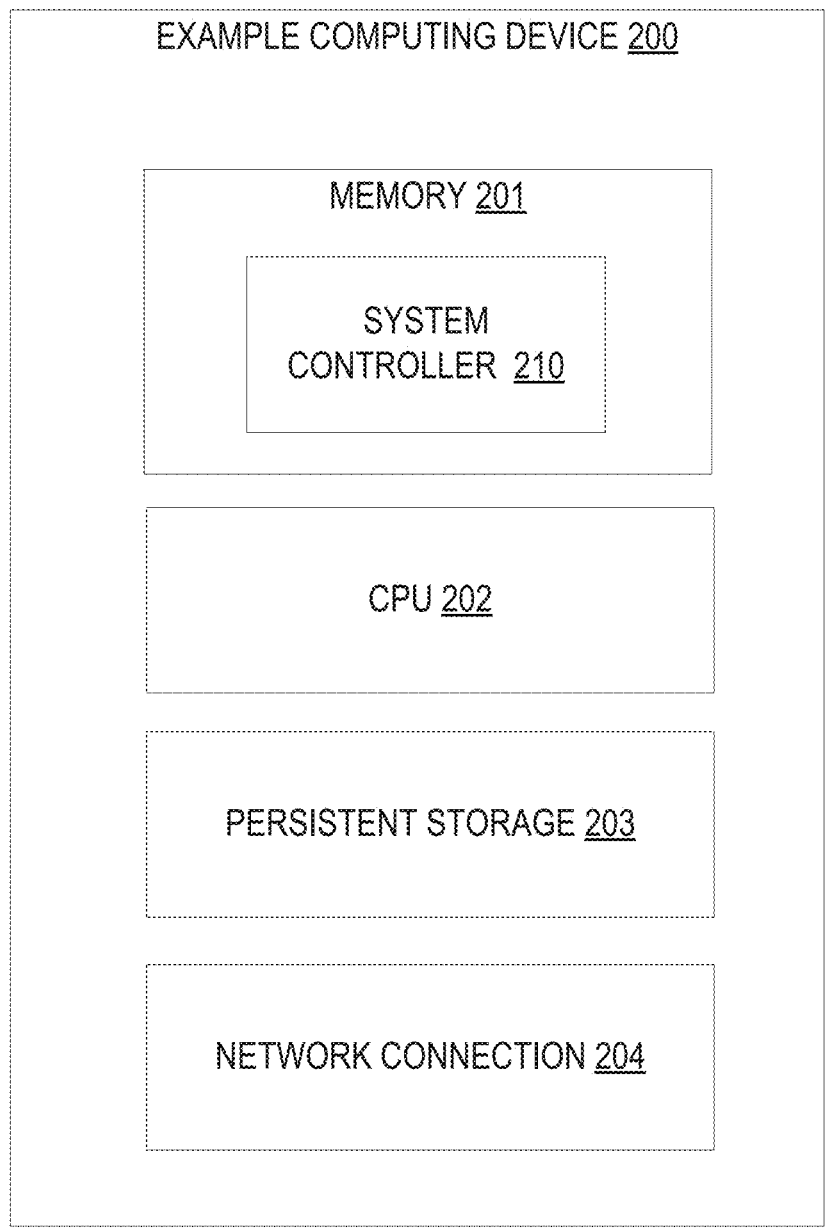
FIG. 2 is a block diagram depicting example components that may be incorporated in a specialized device of FIG. 1 (e.g., an AI system, a server device, client device, or other computing device for a scripted audio production technology system described herein) on which the systems and methods described herein may operate and which may execute and/or implement the systems and methods described herein, according to various embodiments of the present disclosure.

FIG. 2 is a block diagram depicting example components that may be incorporated in a specialized device of FIG. 1 (e.g., an AI system, a server device, client device, or other computing device for a scripted audio production technology system described herein) on which the systems and methods described herein may operate and which may execute and/or implement the systems and methods described herein, according to various embodiments of the present disclosure.

In various embodiments, the computing device 200 may be an example of, or may include example components of, one or more of the devices of FIG. 1, including the client devices 102 and various devices of the server system 108. In various embodiments, the computing device 200 includes one or more of the following: a computer memory 201 for storing programs and data while they are being used, including programs and associated data implementing and/or comprising the systems described herein, an operating system including a kernel, and device drivers; a central processing unit ("CPU") 202 for executing computer programs (including computer-executable instructions); a persistent storage device 203, such as a hard drive or flash drive for persistently storing programs and data; and a network connection 204 for connecting to one or more devices and/or other computer systems to send and/or receive data, such as via the Internet or another network and associated networking hardware, such as switches, routers, repeaters, electrical cables and optical fibers, light emitters and receivers, radio transmitters and receivers, and the like. While a computing device 200 configured as described above is typically used to support the operation of the systems described herein, those skilled in the art will appreciate that the system may be implemented using devices of various types and configurations, and having various components which, when configured to perform the operations and processes described herein are specialized non-generic devices. The memory 201 may include a system controller 210 which comprises and/or executes computer-executable instructions that, when executed by the CPU 202, cause the computing device 200 to perform the operations and functions described herein. For example, the programs, including algorithms, referenced herein which may be stored in computer memory 201 may include or be comprised of such computer-executable instructions.

The system controller 210 performs the functions of the computing device 200, as discussed herein. In an example embodiment, the system controller 210 and/or computer-executable instructions stored on memory 201 of the computing device 200 are implemented using various programming techniques. For example, the system controller 210 and/or computer-executable instructions stored on memory 201 of the computing device 200 may be implemented as a "native" executable running on CPU 202, along with one or more static or dynamic libraries. In other embodiments, the system controller 210 and/or computer-executable instructions stored on memory 201 of the computing device 200 may be implemented as instructions processed by a virtual machine that executes as some other program. In general, a range of programming languages may be employed for implementing such example embodiments, including representative implementations of various programming language paradigms and platforms, including but not limited to, object-oriented (e.g., Java, C++, C#, Python, R, PHP, JavaScript, Ruby, Perl, Object Pascal, Objective-C, Dart, Swift, Scala, Kotlin, Common Lisp, MATLAB, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions may be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The system controller 210 and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Furthermore, in some embodiments, some or all of the components/portions and/or functionality provided by the computer-executable instructions stored on memory 201 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In example embodiments, scripted audio production may include one or more of the following processes: proofing, pronunciation, pause editing, audio editing, and boundary detection system processes. Scripted audio production may include implementing one of more of the following core algorithms: a text-to-text comparison algorithm (e.g., the Longest Common Subsequence Algorithm, comparing the manuscript to a computer generated transcription of an audio recording), a logit to text comparison algorithm (e.g., the Longest Common Subsequence Algorithm, which includes comparing a probability distribution that is the result of a machine learning automatic speech recognition algorithm to a piece of text), fuzzy text search, Viterbi based logit resizing, Connectionist Temporal Classification (CTC) absolute time alignment with root mean square (RMS) and Voice Activity Detector (VAD) detection loss, and grapheme-to-phoneme pronunciation equivalence.

In various embodiments, the scripted audio creation computerized process described herein decreases production time and may comprise several phases: casting (finding the right voice actor), pronunciation research and script preparation (making sure that the actor is well aware of the story and that he/she knows how to pronounce names/words properly), narration (the process of transforming text into a live story in front of a microphone, editing (deleting stray noises, adjusting the pacing, incorporating any corrections (pickups)), proofing (during this phase one needs to make sure that the audio is clean, corresponds to the script (ideally word for word), has no distracting elements, words are pronounced properly and the overall performance is in order), and mastering (adding final touches to the audio, applying equalization, ensuring proper audio levels, so that it sounds great in its final form).

Script preparation may include pronunciation research, which is the process of finding the words in a book that are hard to pronounce and identifying their correct pronunciation. This procedure is done before the audio is recorded and allows narrators to avoid mistakes later in the narration process.

One of the most terrifying mistakes for a narrator is learning that the name of the main character was mispronounced throughout the whole book. Such an error may result in hundreds of pickups they must rerecord and a significant amount of wasted time fixing them, or worse, bad reviews for the book. The scripted audio production technology described herein helps with this process in three ways: by automatically extracting words that sound complicated from the manuscript and are likely candidates for mispronunciation; by incorporating existing pronunciation dictionaries and resources to help narrators identify the proper pronunciation; and by automatically learning to provide better suggestions for the above items by incorporating data as users use the tool.

For extracting complicated words that may need further research, one example embodiment implements an algorithm that uses information about a word and its context to see if it might be considered complicated or not. Even if the algorithm does not return perfect results, and proposes 1000 words that may need further research, this is still faster than having to read through a whole 100,000 word book to select the words for a pronunciation research list.

The following is one example embodiment of the process: A customer uploads their manuscript to the scripted audio production technology system, (e.g., in a PDF or DOCX format). The scripted audio production technology system then parses the manuscript and extracts the text of the main book from it. Page headers, footers and other text which is not read are eliminated. The scripted audio production technology system looks at every word in the manuscript and its context and identifies if each word is complicated enough to qualify for human review. In an example embodiment, a word is identified as "complicated enough" if it passes one of several tests that the system checks against. For example, one test may be if a word contains foreign characters. Another test may be if the word contains capital letters that indicate a proper noun. Another test may be if the word contains letter combinations that are likely to indicate pronunciation difficulty. Another test would be a neural network algorithm such as a named entry recognition (NER) model marking that word as needing additional review.

The scripted audio production technology system may provide a list of those words to the user via a web interface. A researcher may then step in and select via interactive user interfaces only the words which require pronunciation research and that are relevant to the narrator. The scripted audio production technology system then finds phonetic spelling and audio for the selected words. A researcher then fills in the blanks via an interactive user interface for the words that were not automatically found. The result is electronically shared with the narrator, for example, through the web interface and/or a separate Excel report.

The narration process may include narrators recording audio into "Digital Audio Workstation" (DAW) software, often times in their own home studios. Example techniques when recording may include open record/roll recording and "punch and roll" recording. In open record/roll recording, the narrator just presses "record" and speaks into the microphone. After any mistake, the narrator pauses for a moment, and then resumes speaking from an earlier point in the script. The narrator traditionally handles removing any duplicate recordings or mistakes in later parts of the process. In "punch and roll" recording, the narrator presses "record" and speaks into the microphone. After any mistake, the narrator presses "stop," backs up the recording to a convenient moment, and presses "record" again. The DAW software plays 2-3 seconds of "preroll" audio, and then the narrator jumps in again where they left off. This means that the final recording is already fairly clean, and does not have nearly as many mistakes left in it to be removed by an audio editor. The scripted audio production technology system uses audio recognition software to make the processes more efficient and easier for narrators.

In one embodiment, the scripted audio production technology system process includes the narrator uploading their manuscript to the system, and pressing "record." As soon as they start speaking, the software of the scripted audio production technology system tracks the point within the manuscript from where they are reading. Any mistakes or deviations from the script are automatically highlighted by the software. Mistakes/Deviations are identified by aligning the provided text against the CTC logits as described in more detail herein, or by aligning the provided text against a live transcription provided by some other automatic speech recognition component. The narrator may then stop, then re-read a sentence after a mistake. The software will automatically piece together the last-read audio into a clean file without the need for any user-interaction.

In another example embodiment, the narrator performs open record to read some audio. Afterwards, they upload the audio and manuscript to the scripted audio production technology system. The software of the scripted audio production technology system automatically processes the "open record" audio, and finds any place where the narrator clearly made a mistake, stopped, and then resumed from an earlier point. All such places are automatically categorized, and a "clean" audio file consisting of the last take of each such place is provided. Also, an interface may be provided to allow selecting from each alternative take, and seamlessly editing those in.

In the process of pause editing and spacing, after recording, every scripted audio production traditionally goes through the hands of a sound editor, who catches some early mistakes and attempts to fix them purely with audio editing techniques. These professionals work with untreated audio, which have all manner of problems. Even if the audio was recorded in a high-end studio, it will still have some background noises, mouth clicks, loud breaths, missing audio, distorted audio, wrong mic techniques, etc. The most laborious, monotonous and time-consuming part of the editing process is working with pauses and pacing. Some scripted audio production customers report that it takes up to 80% of the time of their editors to handle these.

Manipulations with pauses are often two-fold: replace most pauses with room tone, and then adjust the pacing when necessary. In filmmaking and television production, room tone or presence, or simply room sound, is the "silence" recorded at a location or space when no dialogue is spoken.[1] Presence is similar to ambience, but is distinguished by a lack of explicit background noise. In an example embodiment, pauses may be detected in the audio by the scripted audio production technology system. Since the scripted audio production technology system also determines the alignment between text and audio (generated as part of the proofing process), the audio by the scripted audio production technology system has a good understanding of what adjustments might be needed for each individual pause.

Traditional filters that work with pauses are usually based on audio energy/spectrogram levels and are threshold-based, which means that they are prone to cutting off silent parts of the words and are not widely applicable for the speech content.

In an example embodiment, an improved scripted audio production technology system enables a process including the following operations. A user uploads script and audio for chapters; the user clicks an "Edit pauses" button. The system may show a configuration from where the user can select durations for different possible punctuation and dialog settings. For example, the user may select to edit all commas within character dialog to be within 200 to 300 milliseconds long (e.g., this may increase pauses if too short and decrease pauses if too long, within some acceptable limits specified by the user). The user may then click a "Process now" button and the system then runs the background process that improves the pauses. In an example embodiment, every chapter of the manuscript gets a new button which the user may select to download edited pauses. The user may download the corrected audio and continue working from there.

Pacing in this context can be considered as the amount of silence after various punctuation marks (e.g., 1 second after each paragraph, 2 seconds in between sections, 0.3 seconds after each comma). In this particular example embodiment, the scripted audio production technology system does not affect the actual rate of the speaking part. The pause editing process also includes replacing the silent parts with "clean room tone," meaning that any extra noises like dog barks/stomach growls in the background get removed too.

Figure 3:
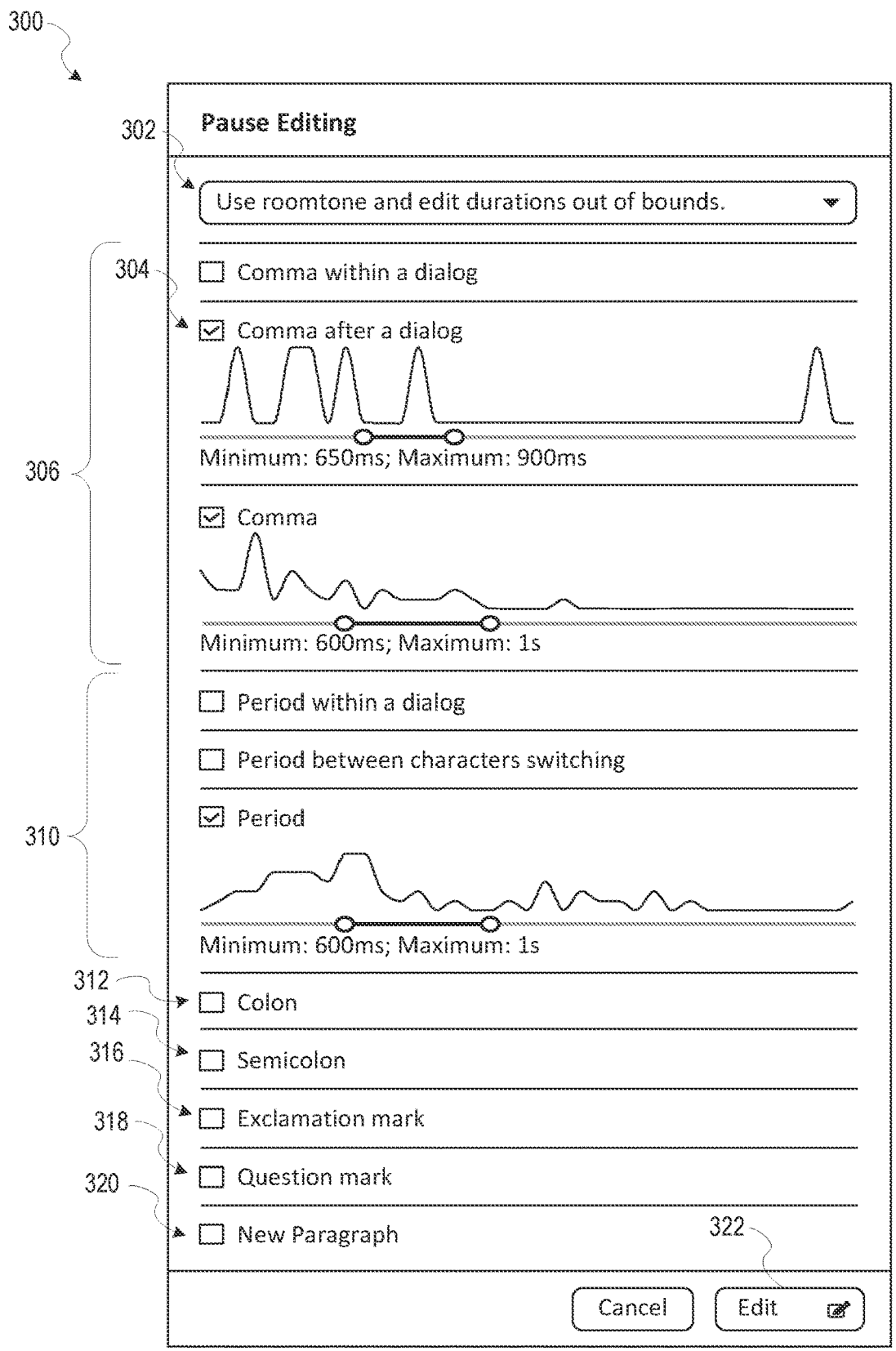
FIG. 3 is a sample view of an example User Interface (UI) for pause editing in a system for scripted audio production, according to various embodiments of the present disclosure.

FIG. 3 is a sample view of an example User Interface (UI) 300 for pause editing in a system for scripted audio production, according to various embodiments of the present disclosure. The UI 300 comprises a control dialog box for pause editing. Shown are selectable user interface elements for a user to select durations for different possible punctuation and dialog settings for pauses and pacing including elements for selecting settings for: using room tone and editing durations out of bounds 302, commas 306, periods 310, colons 312, semicolons 314, exclamation marks 316, question marks 318 and new paragraphs 320. Various other settings for other items in the manuscript text may be present in various other embodiments. In the present example, the user indicates to the system to replace all pauses which correspond to "Commas after a dialog" 304 to be within the range of 650 to 900 milliseconds. The system shows a histogram of what the pauses of this sort currently look like in the unedited audio for reference when setting the new parameters. The user may then select the "edit" button 322 to perform the editing based on the selections.

Proofing is the process of finding all sorts of mistakes and discrepancies in the recorded audio that should not make it into the final version of the scripted audio production. Some examples of such errors are: missing audio, duplicated sentences, background noises, misreads, mispronunciations, wrong character voices, cut-off breaths. Traditionally, proofers must juggle between three applications (an audio player, a PDF reader with script and spreadsheets for making notes), while trying to catch all the things mentioned above. This inadvertently leads to missing errors and mental exhaustion.

The scripted audio production technology system described herein changes this process to be more efficient, produces more accurate results and frees up the mental capacity of a proofer to pay more attention to artistic choices. The scripted audio production technology system described herein makes this possible by implementing: combining the view of the audio-player, manuscript and error notes all in the same place; synchronizing the text and audio, which allows for faster navigation and easy marking of errors and allows for the user to click on any word in the script and get its timestamp in their audio editor; pre-filling available info (like timecodes or page numbers) into a spreadsheet, automatically, which the proofer used to do manually; making automated suggestions about some types of mistakes in the audio, like discrepancies with the written text or lengthy pauses, for example, by comparing the manuscriptagainst the CTC logits directly as explained below (for example, the manuscript and CTC logits are compared, and any place where they do not line up is a candidate for an automated suggestion), or by comparing the manuscript against an automatically generated transcription of the audio; automatically generating reports with all the notes from the proofer, that are then used by other team members; allowing users to tag their notes to be directed to a specific member of their team (e.g., long pauses can be shortened by editor (tagged as @editor), incorrect sentences must be reread by the narrator (tagged as @narrator1)); creating a report automatically, which means that the scripted audio production technology system takes all of the notes for a specific team member, and puts together a report with text and audio snippets around each note for reference purposes. Oftentimes this is necessary to meet contractual obligations (e.g., a union narrator may require that their pickups arrive in a certain form, and this may be created automatically with the scripted audio production technology system).

As a result of the technological improvements above and others described herein, the scripted audio production technology system brings the director role back into the process, which significantly improves the overall quality of the final product.

Figure 4:
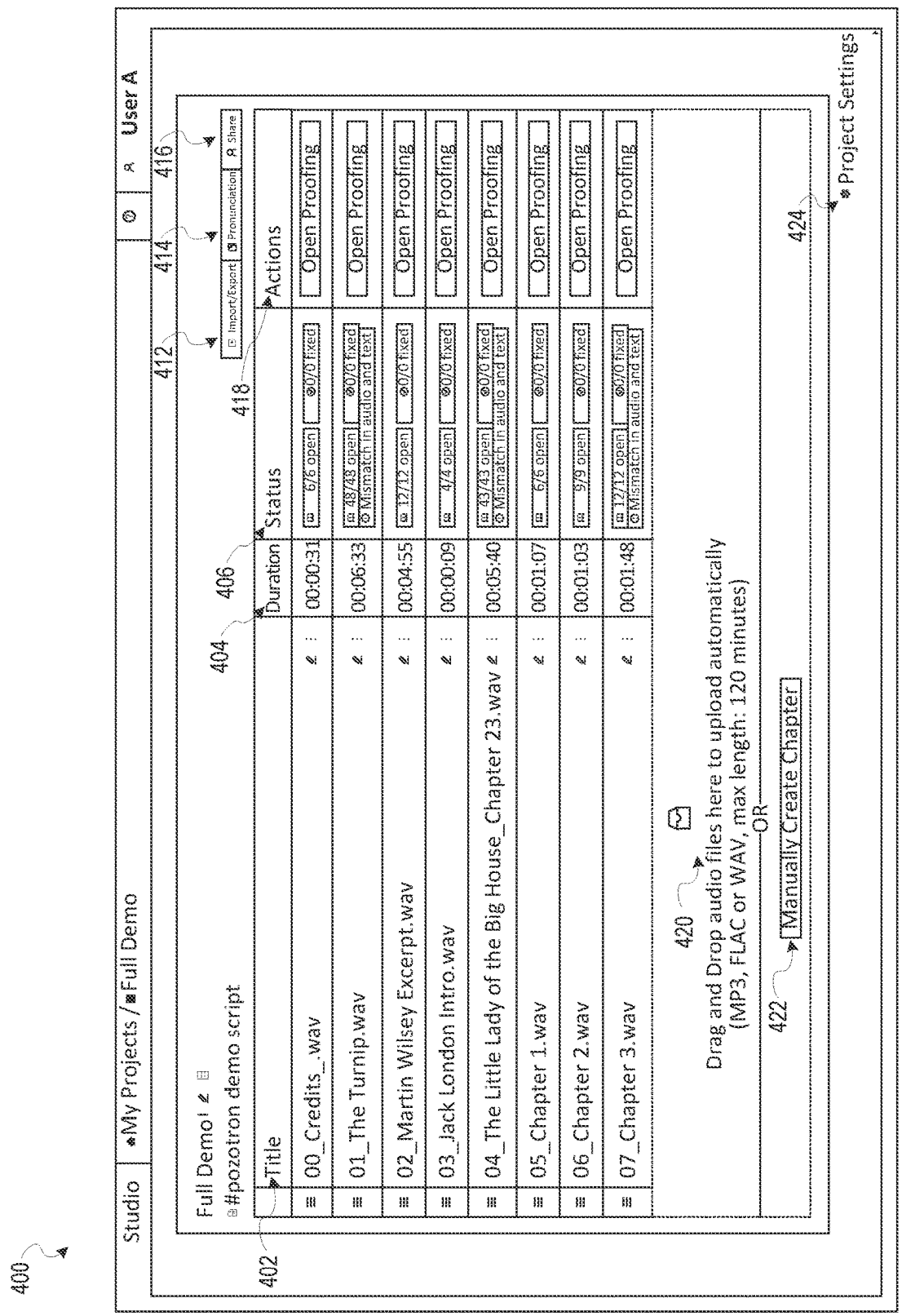
FIG. 4 is a sample view of an example project management UI in a system for scripted audio production, according to various embodiments of the present disclosure.

FIG. 4 is a sample view of an example project management UI 400 in a system for scripted audio production, according to various embodiments of the present disclosure. Shown is a list of each title 402 within a project, the duration 404 of each chapter, the status 406 of each chapter, and actions 418 that may be selected for each chapter. Also shown is a user interface element 420 that enables dragging and dropping of audio files to upload automatically that may include chapters to be processed as described herein and a user interface element 422 that enables manually creating chapters, such as by recording them. Also shown is a user interface element 412 enabling importing and exporting of audio files, text files and reports; a user interface element 414 to initiate a pronunciation research and script preparation process as described herein; and a user interface element 416 enabling electronically sharing audio files, text files and reports as described herein. A project settings element 424 is also displayed in the UI 400 that enables a user to adjust projects settings, for example, those provided in the UI 300 for pause editing shown in FIG. 3.

Figure 5:
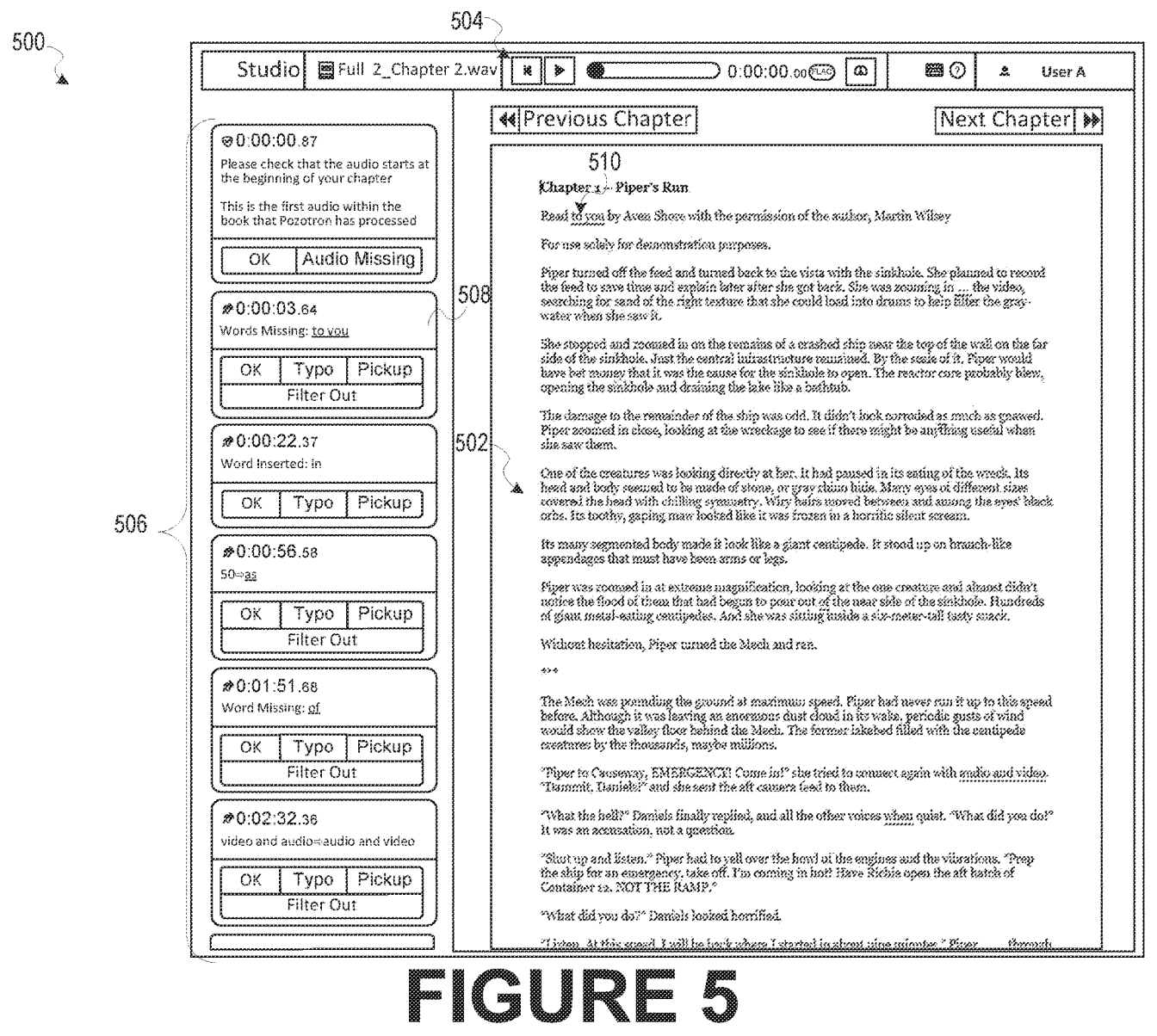

FIG. 5 is a sample view of an example UI 500 in a system for scripted audio production displaying discrepancies between a manuscript 502 and a corresponding portion of recorded audio of speech generated from reading of the manuscript 502, according to various embodiments of the present disclosure. In the example embodiment, the manuscript 502 is shown in the center of the UI 500, an audio player 504 for playing the recorded audio is shown at the top of the UI 500, and the list of potential mistakes 506 in the recorded audio is shown on the left side of the UI 500. Locations in the manuscript of the potential mistakes 506 in the recorded audio are shown as underlined words in the manuscript. For example, the mistake "Words Missing: to you" in the recorded audio is shown as potential mistake 508 in the list of potential mistakes 506 and as underlined words 250 in the manuscript 502. In the present example embodiment, the location within the recorded audio (e.g., timestamp) of the potential mistake; a description of the potential mistake; and options to indicate either the potential mistake is not a mistake or is minor and does not need to be edited ("OK"), needs to be edited ("Pickup"), is a typo in the manuscript ("Typo"), or is a repeated potential mistake that is not a mistake or is minor and does not need to be edited ("Filter Out") are also shown adjacent to or otherwise in conjunction with the corresponding potential mistake in list of potential mistakes 506. In an example embodiment, when the user selects a particular potential mistake in the recorded audio from the list of potential mistakes 506, the potential mistake is highlighted or otherwise marked in the list and the corresponding words in the manuscript 502 are also highlighted or otherwise marked. In an example embodiment, while the user is reading the manuscript 502 and it is being recorded, potential mistakes in the recorded audio are detected by the system and shown and highlighted in the list of potential mistakes 506 and in the manuscript 502 as or immediately after they occur.

Algorithms implemented by the scripted audio production technology system may include: alignment of two pieces of text, alignment of text and CTC logit arrays, CTC absolute time alignment with RMS/VAD detection loss, document heuristics to remove extra text from manuscripts ("docparse"), "text normalization", "reverse normalization," fuzzy text alignment with automatic speech recognition (ASR), context aware "logit" resizing for effective ASR ensembles, and grapheme-to-phoneme pronunciation equivalence.

Alignment of text and CTC logit arrays compares a piece of text, and an audio recording of that text to identify any discrepancies. Machine learning/AI algorithms are used by the scripted audio production technology system to convert recorded audio into some probabilistic representation. This is called Automatic Speech Recognition or ASR. Such algorithms take an audio file of recorded speech as input. That audio is converted into some intermediate representation such as mel-spectrogram intensities, log-filter bank spectrums, MFCCs, vocoder features, etc. Those intermediate features go into a machine-learning model. Examples include a convolutional neural network, transformer network, etc. They may train on Connectionist Temporal Classification (CTC) loss. CTC is used to train deep neural networks in speech recognition, handwriting recognition and other sequence problems. When mapping input sequences $X=[x_1, x_2, \ldots, x_T]$, such as audio, to corresponding output sequences $Y=[y_1, y_2, \ldots, y_U]$, such as transcripts, a goal is to find an accurate mapping from X's to Y's. There are challenges which impede usage of simpler supervised learning algorithms. In particular, both X and Y can vary in length and the ratio of the lengths of X and Y can vary. Thus, there is not an accurate alignment (correspondence of the elements) of X and Y. The CTC algorithm overcomes these challenges. For a given X it gives an output distribution over all possible Y's. This distribution may be used either to infer a likely output or to assess the probability of a given output. Not all ways of computing the loss function and performing inference are tractable. CTC may do both of these efficiently. Regarding the loss function, for a given input, the model is trained to maximize the probability it assigns to the right answer. To do this, computing the conditional probability $p(Y \cong X)$ is performed. The function $p(Y \cong X)$ is also be differentiable, so gradient descent can be used. After the model is trained, it is used to infer a likely Y given an X. Examples of ASR models include end-to-end speech recognition with deep convolutional neural networks, such as, for example, Awni Hannun et al., *Deep Speech: Scaling up end-to-end speech recognition*, Baidu Research—Silicon Valley AI Lab, arXiv:1412.5567v2 [cs.CL] 19 Dec. 2014; Dario Amodei et al., *Deep Speech 2: End-to-End Speech Recognition in English and Mandarin*, Baidu Research—Silicon Valley AI Lab, arXiv:1252.02595v1 [cs.CL] 8 Dec. 2015; Daniel S. Park et al., *SpecAugment: A Simple Data Augmentation Method for Automatic Speech Recognition*, Google Brain, arXiv:1904.08779v3 [eess.AS] 3 Dec. 2019; William Chan et al., *Listen, Attend and Spell*, Carnegie Mellon University, arXiv:1508.01211v2 [cs.CL] 20 Aug. 2015.

The result or output of the CTC process is "CTC logits," which are a probability distribution over the text which was likely said by the speaker in the source audio. Most commercially available Automatic Speech Recognition (ASR) systems then take those CTC logits, and apply some additional language models to them in order to present the single most likely interpretation of the recorded speech as text. Some systems like that of Google even allow one to see the top-5 or top-N most likely interpretations of the text. However, the scripted audio production technology system goes one step further with the direct comparison against text-and-CTC logits to provide better performance. The algorithm of the scripted audio production technology system described herein is an improvement over this process because it takes the CTC logits and compares them directly to the manuscript provided by users of the scripted audio production technology system. The comparison is done using dynamic programming, such as the Viterbi algorithm, which is a dynamic programming algorithm for obtaining the maximum a posteriori probability estimate of the most likely sequence of hidden states (called the Viterbi path) that results in a sequence of observed events, especially in the context of Markov information sources and hidden Markov models (HMM), or other sequence alignment algorithms.

In an example embodiment, the loss function used by the dynamic programming algorithm is set up to account for how CTC loss works: namely two characters can be repeated and this does not count as a loss penalty, unless there is a blank token between them. This refers to two characters repeated inside of the CTC logits (e.g., if there are three CTC rows which both have the letter "A" with 99.9% probability, then that represents the final text "A," but if there is a row with "A," then a blank token, then an "A," then that corresponds to a double letter "AA" in the final text.

Also, the input text sequence is preprocessed, to look for any intentionally duplicated characters, like the "l" in "hello," and blank tokens are inserted into the comparison sequence. This input text sequence refers to the manuscript that the user provided.

By comparing against the CTC logits directly, the system reduces the number of false positive detections dramatically. This is because the system automatically looks at all possible variants contained in the probability distribution, not just the top one or top five most likely interpretations. For example, this may be detection of a word the narrator said that is different than what should have been said based on the manuscript. This is the detection of discrepancies between the text and the audio. These are highlighted for users to review manually, and the goal is to have them be as accurate as possible without many false positives. Looking at all possible variants contained in the probability distribution means all of the variants of text that a computer could possibly "hear" within the audio itself (e.g., if one says "he went to church," the computer may correctly hear "he went to church," but, sometimes the narrator may have actually said "he went to lurch"). Traditional systems like Google's handle this by asking "how many top interpretations do you want to see?". And one may say, "show me the top five likely ones for this sentence." This is not ideal as it forces users to compare each of the five variants. This is especially not ideal if one has 100 sentences and the top five variants for each one, which leads to an exponential number of cases to consider. One of the innovations of the scripted audio production technology system described herein is that the scripted audio production technology system described herein lets one check all of the top variants at once, by looking at the probability distribution directly.

The scripted audio production system may use CTC Absolute Time Alignment with RMS/VAD detection loss. Many machine learning (ML) algorithms and papers discuss Automatic Speech Recognition, or "ASR," converting speech to text. Many such algorithms are trained using CTC loss, as described above. However, it is also desirable to know not just what words were said within the audio, but also their exact starting and end timecodes. CTC loss, while great for character-level accuracy of speech recognition, does not explicitly provide for capturing the time alignment of each word. However, the result of a CTC-trained model, the CTC logit matrix, does have a size that is a fixed multiple of the size of the audio input.

It may be argued that, in theory, it is possible to just extract character timestamps by finding which row in the CTC logit matrix best corresponds to the chosen character/word, and then scaling that by some fixed multiple. The issue is that CTC loss doesn't penalize or reward aligning the resulting probabilities with the timecodes directly, and so a naive implementation would result in timestamps that drift+/−from the actual true start time of any given word or character. The scripted audio production technology system described herein corrected this by introducing a second loss term during the CTC training process, which encourages the ML model to align the resulting logits with any silent sections in the audio. The scripted audio production technology system described herein does this by running a commercially available Voice Activity Detector (VAD) and creating a second loss term that requires the logits where no one is detected to be speaking to be categorized as "blank." This loss term is multiplied by a small constant, and then added to the main CTC classification loss during model training. In various embodiments, other techniques may be used, like an RMS-threshold to determine places in the audio where no one is speaking.

Document Heuristics to Remove Extra Text from Manuscripts, "Docparse"

Users may direct the scripted audio production technology system described herein to process the manuscripts of their scripted audio. These manuscripts are provided in formats such as PDF, .docx, or .epub. A PDF is really just "postscript" language codes describing how the print version of the book would look, but stored in a file format. Such "print" based formats include extra information such as page numbers, headers, footers, front matter, footnotes, etc., that are extraneous to what the narrator will read when the media is in scripted audio form. Previous systems used some text-based processing to try to remove this extra text. Ex. they applied rules such as "if a number appears between two sentences, then delete it." This, however, is not perfect and misses many cases, resulting in a poor conversion and many false positives.

The algorithm of the scripted audio production technology system described herein operates on the processed post-script itself, meaning that the system knows the font, position, size, shape, orientation, etc., of each block of text in the source manuscript. This means that the system applies rules that are more advanced, like "if a number appears at the center bottom of the page with a small font size, then delete it," which leads to better results.

Normalization

Many speech technologies rely on "normalizing" the text which represents a given segment of speech. For example, the text "We ate a pie in 2019" could be read as "We ate a pie in twenty nineteen," or "We ate a pie in two thousand nineteen." So the text containing numbers, abbreviations, etc., needs to be converted into fully written out text which is exactly the same as what someone will say. Some text is even ambiguous: "Catherine I wanted a pie" could be "Catherine the first wanted a pie," or "Catherine, I wanted a pie," depending on the context. When the text is compared to the audio during the proofing process of the scripted audio production technology system described herein, the system makes sure the text is normalized. At the same time, there are many potential ambiguities in the normalization process. To account for this, first the scripted audio production technology system described herein does one pass, picking the single most likely normalization for any sentences in which it is necessary.

Next, the scripted audio production technology system described herein runs a proofing algorithm against this best-guess normalized text and the audio. The scripted audio production technology system described herein then looks at all places where the proofing algorithm reported an error, but this error was in a place where text normalization had been applied. For example, if the text said "We ate a pie in 2019" and it was normalized as "We ate a pie in twenty nineteen," but the proofing system still reports an error in that case, then the system does a second check. The system then finds the single most likely representation of the actual audio, from the CTC logits probability distribution. This is called the "greedy decoding." If that greedy decoding was "two thousand nineteen," for example, which corresponds to "2019" in the text, then the algorithm knows that this was not a mistake, and it can be suppressed.

Fuzzy Text Alignment with ASR

Customers often upload an entire manuscript to the system at once, and then ask the system to check individual chapters for proofing errors. The scripted audio production technology system described herein uses speech recognition to process their audio, and then uses an algorithm to locate which chapter from the manuscript was used.

There are two example ways that the system may do this: If the system already has a manuscript that has chapter formatting embedded in it, then the system runs a dynamic programming-based sequence comparison algorithm against each chapter, and the greedy-decoded logit text, and picks the chapter with the lowest loss. The system may locate the target text among the entire manuscript if the chapter formatted data is not embedded in the input.

Context Aware "Logit" Resizing for Effective ASR Ensembles

Having an "ensemble" of models and techniques applied to a given problem is a good way to get better performance than just using a single model. For example, when classifying images, the system may have one classifier based on Convolutional Neural Networks, and another based on a different sort of Neural Network architecture, and both of these systems are trained. At the end, the system combines their results, often with either a simple regression model, or just averaging their outputs, to get a more accurate prediction. This is often not possible in ASR models, because the output logit distribution can be different between different models. For example, it can have a different ratio of input frames to output frames, making it so that it is impossible to average the results of different models into an ensemble prediction.

One example technique of the scripted audio production technology system described herein is to use dynamic programming to "resize" the output frames from different models (or from different variations on the same model) to be the same size. The system applies a standard sequence comparison algorithm to the two different output matrices, in an attempt to expand the size of the smaller matrix into the size of the larger one. If two sections of the sequence are similar to each other, they are just added to the larger matrix, showing that the prediction is very certain. If two sections are different, then they get averaged together and added, making the final prediction more uncertain. Aligning two input sequences like this would potentially be extremely slow, but a further innovation of the scripted audio production technology system described herein is to search only around a limited window around the "diagonal" of the matrix. At the end, the result of output is two matrices of the same size, so the system takes a simple average, or converts to log-probabilities, and then averages, to get a combined prediction from an ensemble of models.

Alignment Method to Improve Teacher-Training of Audio Models

Certain Text-to-speech models like Tacotron, Tacotron 2, and Wavenets exist such as: Yuxuan Wang et al., *Tacotron: Towards End-to-End Speech Synthesis*, Google, Inc., arXiv: 1703.10135v2 [cs.CL] 6 Apr. 2017; Jonathan Shen et al., *Natural TTS Synthesis by Conditioning WaveNet on Mel Spectrogram Predictions*, Google, Inc., University of California, Berkeley, arXiv:1712.05884v2 [cs.CL] 16 Feb. 2018; Aaron van den Oord et al., *WaveNet: A Generative Model for*

Raw Audio, Google DeepMind, London, UK, arXiv: 1609.03499v2 [cs.SD] 19 Sep. 2016.

Several such models may be trained in sequence in order to produce the highest quality results. For example, one may train a Tacotron 2 model to produce low-fidelity speech features, and then WaveNet after that to convert the speech features into high fidelity speech. When training a recurrent model, such as the ones mentioned above, it is common to use a technique called "teacher forcing." This means that when training a model, which may output a long sequence of results, for example, a list of speech features representing a whole sentence, then it is desirable to feed in the prior "ground-truth" data at each training step, instead of depending on the model to learn a whole sequence all at once. Then, only at inference time, where ground-truth data is not available, pass in the previous prediction in order to get the subsequent prediction. If there are multiple models that operate in sequence, that means that during inference, any errors will compound, leading to bad results since any small drifts are no longer being corrected by the teacher-forcing as they were during model training. Yet, if sticking to using "teacher forcing," the second or subsequent networks on data will not train, which will be representative of what is in the true inference setting.

The scripted audio production technology system described herein uses the same dynamic programming-based sequence comparison algorithms described herein instead of teacher forcing when training multiple models in a sequence.

Optionally, the system may train the first model in the sequence initially with some teacher forcing, to allow it to do initial learning at a faster rate. The subsequent models will be trained on this teacher-forced output, also to bootstrap learning speed.

Next, the system will switch to training the first model without teacher-forcing, predicting each output only based on prior predictions made by the model itself. Normally, this would compromise the subsequent models, because the first model will start producing sequences which are not the same length as the original training data. To correct this, the scripted audio production technology system described herein uses a dynamic programming-based sequence comparison algorithm to compare the fully-inference first model outputs, and the ground-truth data. The fully inferenced models are shrunk or expanded to be the same length as the ground-truth data, but still preserve their fully inference characteristics.

In one example embodiment, an algorithm such as Seam Carving as found in Shai Avidan and Ariel Shamir, *Seam Carving for Content-Aware Image Resizing*, Mitsubishi Electric Research Labs and The Interdisciplinary Center & MERL may be used to make the outputs the same size as the ground truth training data:

In various embodiments, other algorithms which may be used by the system include those described herein with respect to "Context aware "Logit" resizing for effective ASR ensembles." Then, the system may continue training all models in the sequence, using this technique in between each model in various example embodiments. After the first model is run, the predicted result is tuned to more closely line up with the input training data, and then fed into the second model.

Grapheme-to-Phoneme Pronunciation Equivalence

When two pieces of text are compared to see if they were pronounced the same way, there may be many ambiguities. Someone may say "new cycle" vs "news cycle" exactly the same way, even though the text is different.

The scripted audio production technology system described herein provides a solution that is to convert to words into a phonetic representation. In one example embodiment, the scripted audio production technology system described herein uses a machine learning model based on finite state transducers. Then, the scripted audio production technology system described herein applies a list of rules/heuristics, such as how the V and F sounds get merged in "way funk" vs "wave funk." If any of the heuristics match, then the scripted audio production technology system described herein determines that the two phrases are pronounced the same way. If no heuristics match, the scripted audio production technology system described herein tries additional top-N phonetic representations for the words queried. For example, if the query was "read" vs "red," the system may check both the "REED" and "REHD" pronunciations against the heuristic rules.

Figure 6:
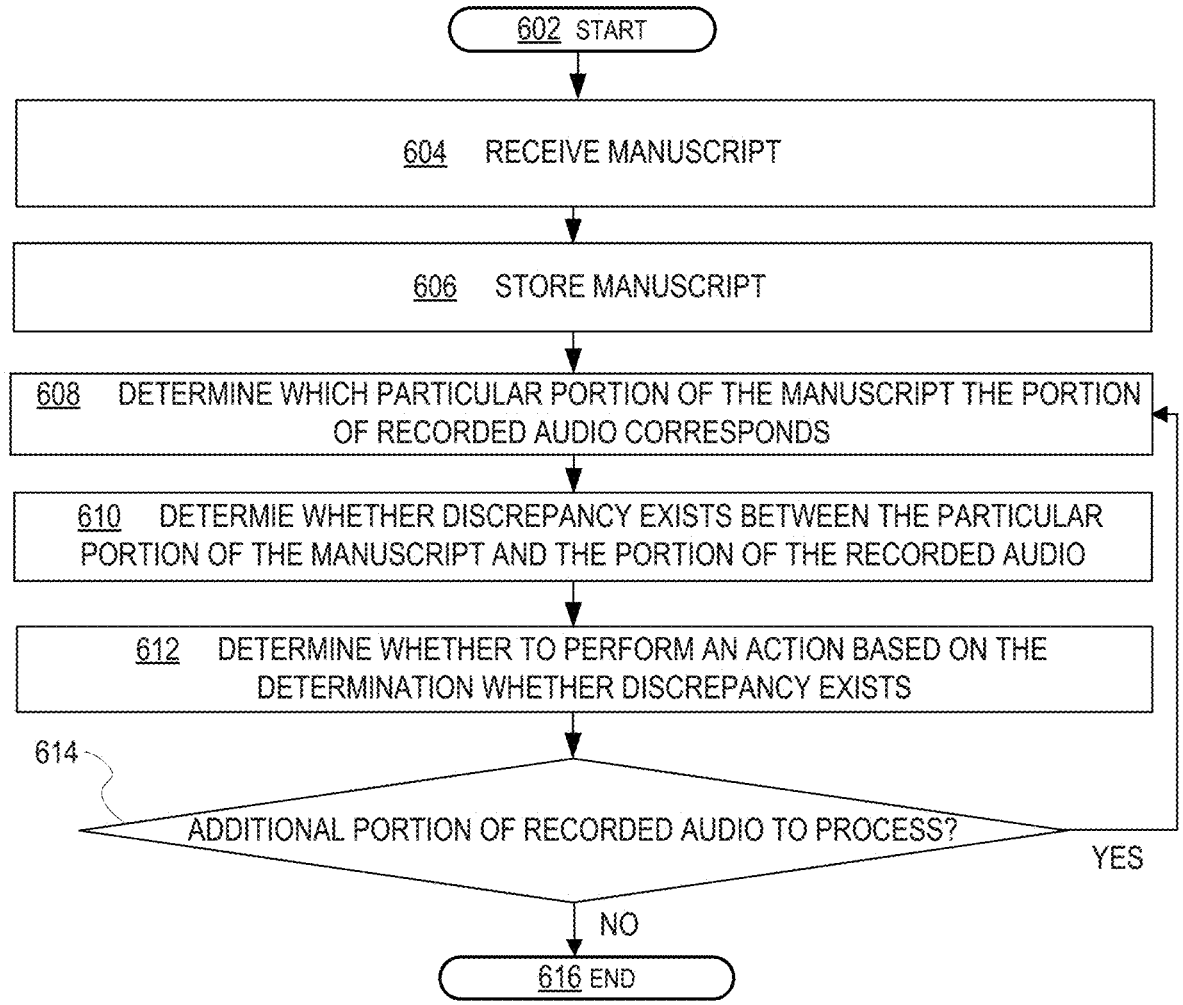
FIG. 6 is a flowchart illustrating a sample method for determining whether a discrepancy exists between particular portions of the manuscript and corresponding portions of recorded audio, according to various embodiments of the present disclosure.

FIG. 6 is a flowchart illustrating a sample method 600 for determining whether a discrepancy exists between particular portions of the manuscript and corresponding portions of recorded audio, according to various embodiments of the present disclosure.

The method 600 may start at 602. At 604 the scripted audio production system electronically receives a manuscript. At 606 the scripted audio production system electronically stores the manuscript. At 608, for each portion of a plurality of portions of recorded audio of speech generated from reading of the manuscript by a narrator, the scripted audio production system electronically determines to which portion of the manuscript the portion of recorded audio corresponds. At 610, for each portion of a plurality of portions of recorded audio of speech generated from reading of the manuscript by a narrator, the scripted audio production system determines whether a discrepancy exists between the portion of the manuscript and the portion of the recorded audio based on the determination of to which particular portion of the manuscript the portion of recorded audio corresponds. At 612, for each portion of a plurality of portions of recorded audio of speech generated from reading of the manuscript by a narrator, the scripted audio production system electronically determines whether to perform an action (e.g., notify a user of the discrepancy) based on the determination whether a discrepancy exists between the portion of the manuscript and the portion of the recorded audio. At 614 the scripted audio production system determines whether there are additional portions of recorded audio to process. If it is determined there are additional portions of recorded audio to process, then the method proceeds back to 608 to continue processing the recorded audio. If it is determined there are not additional portions of recorded audio to process, then the method may end at 616.

Figure 7:
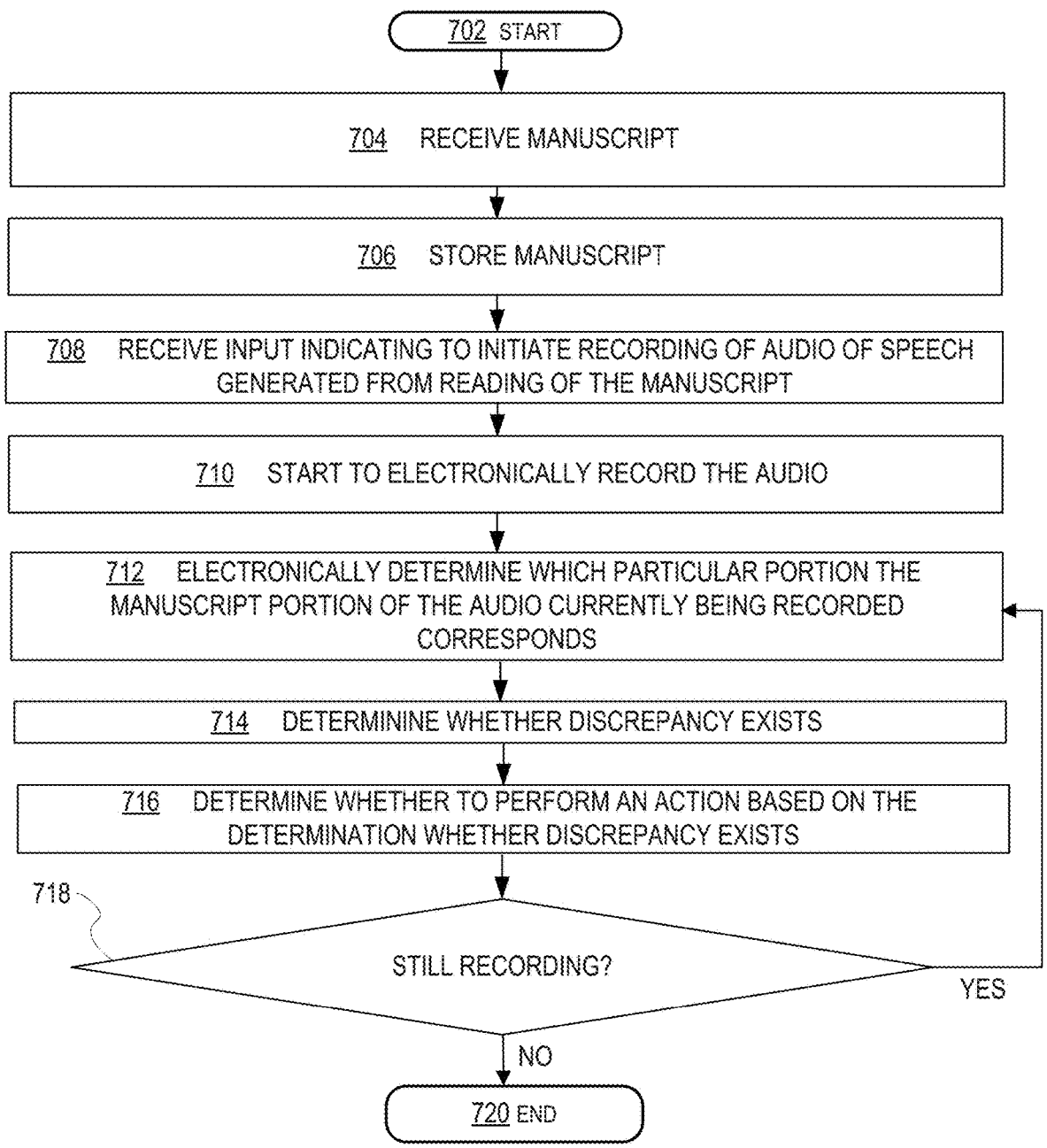
FIG. 7 is a flowchart illustrating a sample method for determining whether a discrepancy exists between a particular portion of the manuscript and corresponding portions of audio currently being recorded as the manuscript is being read by the narrator, according to various embodiments of the present disclosure.

FIG. 7 is a flowchart illustrating a sample method 700 for determining whether a discrepancy exists between a particular portion of the manuscript and corresponding portions of audio currently being recorded as the manuscript is being read by the narrator, according to various embodiments of the present disclosure.

The method 700 may start at 702. At 704 the scripted audio production system electronically receives a manuscript. At 706 the scripted audio production system electronically stores the manuscript. At 708 the scripted audio production system electronically receives input indicating to initiate recording of the audio of speech generated from reading of the manuscript. At 710 the scripted audio production system, in response to the input, starts to electronically record the audio of speech. At 712 the scripted audio production system, in response to starting to electronically record the audio of speech, while recording the audio of speech, electronically determines to which portion of the manuscript a portion of the audio currently being recorded corresponds. At 714 the scripted audio production system, while recording the audio of speech, automatically determines whether a discrepancy exists between the portion of the manuscript and the portion of the audio currently being recorded based on the determination of to which particular portion of the manuscript a portion of the audio currently being recorded corresponds. At 716 the scripted audio production system electronically determines whether to perform an action (e.g., notify a user of the discrepancy) based on the automatic determination of whether a discrepancy exists between the portion of the manuscript and the portion of the audio currently being recorded. At 718 the scripted audio production system determines whether the system is still recording the audio of speech. If it is determined the system is still recording the audio of speech, then the method proceeds back to 712 to continue processing the recorded audio. If it is determined the system is not still recording the audio of speech, then the method may end at 720. The method 700 may resume when recording of the speech resumes.

Figure 8:
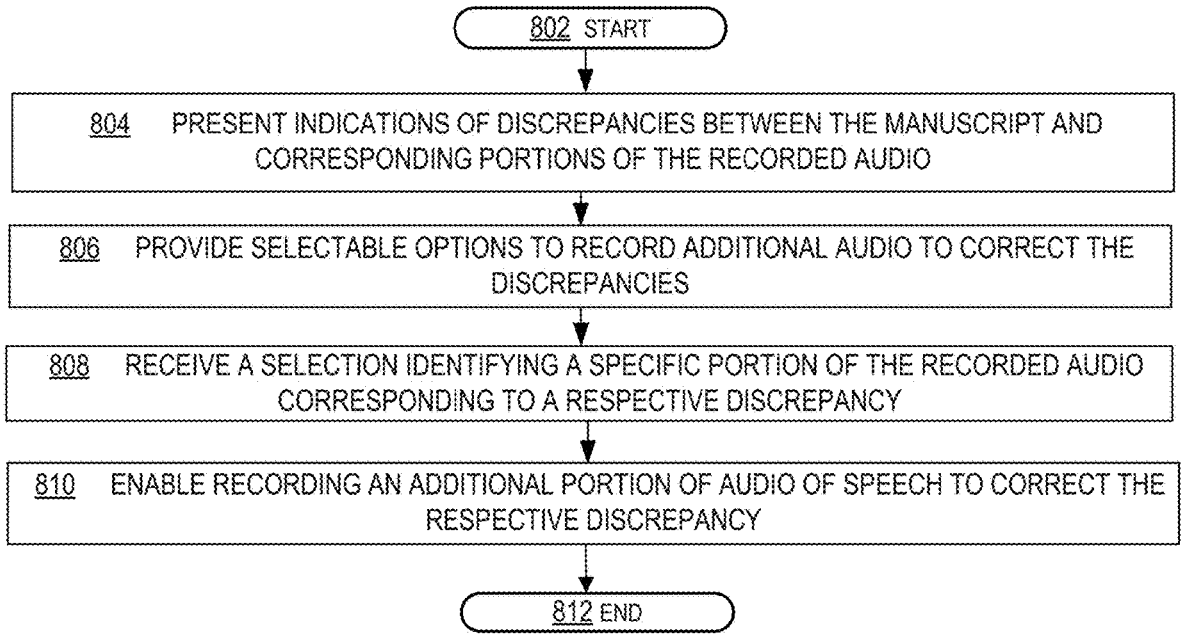
FIG. 8 is a flowchart illustrating a sample method for enabling recording of additional portions of audio to correct detected discrepancies between particular portions of the manuscript and corresponding portions of recorded audio, according to various embodiments of the present disclosure.

FIG. 8 is a flowchart illustrating a sample method 800 for enabling recording of additional portions of audio to correct detected discrepancies between portions of the manuscript and corresponding portions of recorded audio, according to various embodiments of the present disclosure.

The method 800 may start at 802.

At 804 the scripted audio production system electronically presents indications of discrepancies between the manuscript and corresponding portions of the recorded audio. At 806 the scripted audio production system electronically provides selectable options to record additional audio of speech generated from reading of the manuscript to correct the discrepancies. At 808 the scripted audio production system electronically receives a selection of at least one of the selectable options identifying a specific portion of the recorded audio corresponding to a respective discrepancy between the specific portion and the manuscript. At 810 the scripted audio production system, in response to receiving the selection, enables recording an additional portion of audio of speech to correct the respective discrepancy. The method 800 may end at 812.

Figure 9:
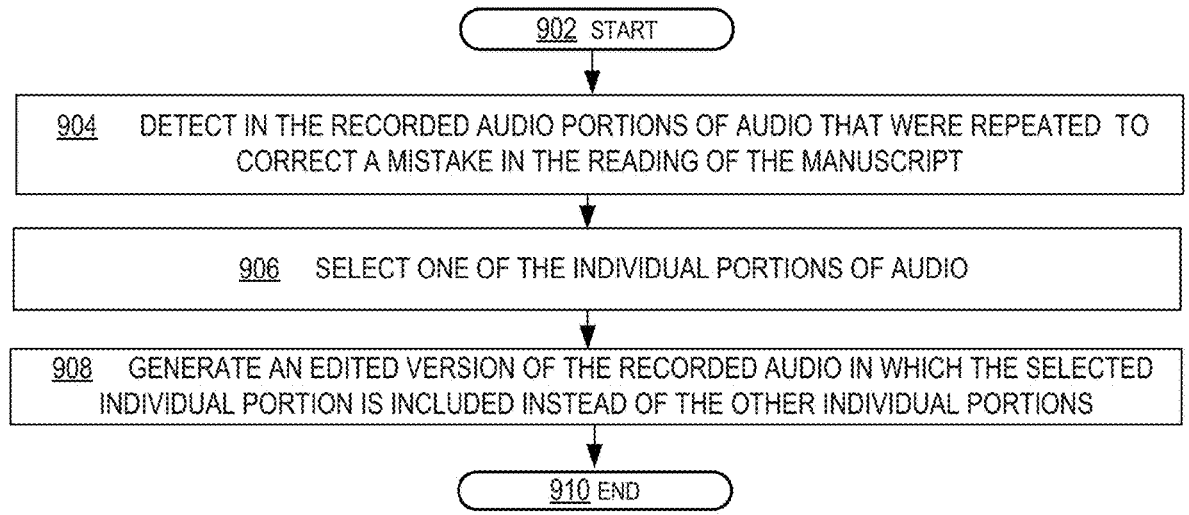
FIG. 9 is a flowchart illustrating a sample method for correcting recorded audio based on portions of the manuscript that were repeated by a reader of the manuscript to correct mistakes in the reading of the manuscript, according to various embodiments of the present disclosure.

FIG. 9 is a flowchart illustrating a sample method 900 for correcting recorded audio based on portions of the manuscript that were repeated by a reader of the manuscript to correct mistakes in the reading of the manuscript, according to various embodiments of the present disclosure.

The method 900 may start at 902. At 904 the scripted audio production system described herein automatically detects, in the recorded audio of speech, individual portions of audio that represent portions of the manuscript that were repeated by a reader of the manuscript to correct a mistake in the reading of the manuscript. At 906 the scripted audio production system electronically selects one of the individual portions of audio that represent portions of the manuscript that were repeated. At 908 the scripted audio production system automatically generates an edited version of the recorded audio of speech generated from reading of the manuscript in which the selected individual portion is included instead of the other individual portions of audio that represent portions of the manuscript that were repeated. The method 900 may end at 910.

Figure 10:
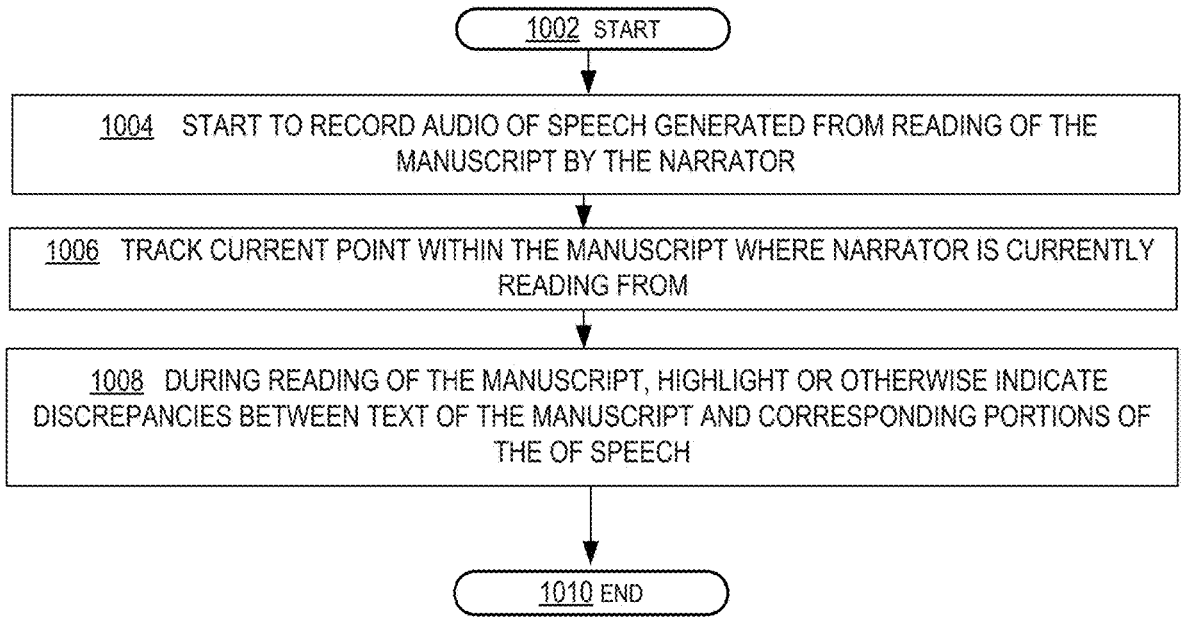
FIG. 10 is a flowchart illustrating a sample method for highlighting or otherwise indicating via a user interface discrepancies between the text of the manuscript and corresponding portions of the of speech generated from reading of the manuscript, according to various embodiments of the present disclosure.

FIG. 10 is a flowchart illustrating a sample method 1000 for highlighting or otherwise indicating, via a user interface, discrepancies between the text of the manuscript and corresponding portions of the of speech generated from reading of the manuscript, according to various embodiments of the present disclosure.

The method 1000 may start at 1002. At 1004 the scripted audio production system starts to record audio of speech generated from reading of the manuscript by the narrator. At 1006 the scripted audio production system described herein, in response to starting to record the audio of the speech, automatically tracks a current point within the manuscript from where the narrator is currently reading while recording the audio generated from reading of the manuscript. At 1008 the scripted audio production system, during the reading of the manuscript, automatically highlights or otherwise indicates, via a user interface, discrepancies between the text of the manuscript and corresponding portions of the speech generated from reading of the manuscript. The method 1000 may end at 1010.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for scripted audio production, the method comprising:
   electronically receiving a manuscript;
   electronically storing the manuscript; and
   for each portion of a plurality of portions of recorded audio of speech generated from reading of the manuscript by a narrator:
      electronically determining to which particular portion of the manuscript the portion of recorded audio corresponds;
      determining whether a discrepancy exists between the portion of the manuscript and the portion of the recorded audio based on the determination of to which portion of the manuscript the portion of recorded audio corresponds, wherein the determining whether the discrepancy exists between the portion of the manuscript and the portion of the recorded audio includes alignment of text of the manuscript and a logit probability distribution that is a result of a Connectionist Temporal Classification (CTC)-trained model; and
      electronically determining whether to perform an action based on the determination whether the discrepancy exists between the portion of the manuscript and the portion of the recorded audio.

2. The method of claim 1 wherein the action is one or more of: flagging the discrepancy, providing a notification regarding the discrepancy and providing one or more options to a user to take an action regarding the discrepancy.

3. The method of claim 1 further comprising:
   electronically receiving input indicating to initiate recording of the audio of speech generated from reading of the manuscript; and
   in response to the input, starting to electronically record the audio of speech, wherein:
      the determining to which portion of the manuscript the portion of recorded audio corresponds includes:
         in response to starting to electronically record the audio of speech, while recording the audio of speech, electronically determining to which portion of the manuscript a portion of the audio currently being recorded corresponds;
      the determining whether the discrepancy exists between the portion of the manuscript and the portion of the recorded audio includes:
         while recording the audio of speech, automatically determining whether a discrepancy exists between the portion of the manuscript and the portion of the audio currently being recorded based on the determination of to which portion of the manuscript a portion of the audio currently being recorded corresponds; and
      the electronically determining whether to perform an action based on the determination whether the discrepancy exists between the portion of the manuscript and the portion of the recorded audio includes:
         electronically determining whether to perform an action based on the automatic determination of whether the discrepancy exists between the portion of the manuscript and the portion of the audio currently being recorded.

4. The method of claim 3 further comprising:
   while recording the audio of speech, in response to determining the discrepancy exists between the portion of the manuscript and the portion of the audio currently being recorded, automatically communicating an indication of the discrepancy to be visible by one reading the manuscript.

5. The method of claim 1 wherein the action is presenting an indication of the discrepancy, and the method further comprising:
   electronically presenting indications of discrepancies between the manuscript and corresponding portions of the recorded audio.

6. The method of claim 1 further comprising:
   automatically detecting in the recorded audio of speech individual portions of audio that represent portions of the manuscript that were repeated by a reader of the manuscript to correct a mistake in the reading of the manuscript;
   electronically selecting one of the individual portions of audio that represent portions of the manuscript that were repeated; and
   automatically generating an edited version of the recorded audio of speech generated from reading of the manuscript in which the selected individual portion is included instead of the other individual portions of audio that represent portions of the manuscript that were repeated.

7. The method of claim 6 wherein the selecting one of the individual portions of audio includes:
   electronically presenting a menu of the individual portions from which a user may select; and
   receiving input indicative of a selection from the menu of one of the individual portions of audio as the selected individual portion.

8. The method of claim 1 wherein the determining whether the discrepancy exists between the portion of the manuscript and the portion of the recorded audio further includes comparing an automatic transcription of a record directly to the manuscript.

9. The method of claim 1 wherein the determining whether the discrepancy exists between the portion of the manuscript and the portion of the recorded audio includes performing document heuristics to remove extra text from the manuscript, wherein the extra text includes one or more of: page numbers, headers, footers and footnotes.

10. The method of claim 1 wherein the determining whether the discrepancy exists between the portion of the manuscript and the portion of the recorded audio includes performing text alignment of text from the manuscript with text resulting from automatic speech recognition (ASR) of the recorded audio of speech generated from reading of the manuscript.

11. The method of claim 1 wherein the determining whether the discrepancy exists between the portion of the manuscript and the portion of the recorded audio includes performing context aware CTC logit resizing for automatic speech recognition (ASR) ensembles.

12. The method of claim 1 wherein the determining whether the discrepancy exists between the portion of the manuscript and the portion of the recorded audio includes performing an alignment method to improve teacher-training of audio models.

13. The method of claim 1 wherein the determining whether the discrepancy exists between the portion of the manuscript and the portion of the recorded audio includes performing grapheme-to-phoneme pronunciation equivalence.

14. The method of claim 1 further comprising:
presenting a graphical user interface that combines a view of: an audio player that plays the recorded audio, the manuscript and an interface for entering and editing error notes all in a same user interface screen of a single scripted audio production application.

15. The method of claim 1 further comprising:
presenting a graphical user interface within a scripted audio production application that visually synchronizes text of the manuscript with corresponding portions of the recorded audio of speech generated from reading of the manuscript.

16. The method of claim 1 further comprising:
starting to record audio of speech generated from reading of the manuscript by the narrator;
in response to starting to record the audio of the speech, automatically tracking a current point within the manuscript from where the narrator is currently reading while recording the audio generated from reading of the manuscript; and
during the reading of the manuscript, automatically highlighting or otherwise indicating, via a user interface, discrepancies between text of the manuscript and corresponding portions of the of speech generated from reading of the manuscript.

17. The method of claim 1 further comprising:
receiving input indicating selection via a graphical user interface of a word in the manuscript; and
in response to receiving the input indicating the selection of the word, outputting for presentation via the graphical user interface a timestamp within the recorded audio corresponding to a recording of the word during reading of the manuscript.

18. The method of claim 1 further comprising:
pre-filling into an electronic document one or more of: timestamps within the recorded audio corresponding to locations within the manuscript and page numbers of the manuscript corresponding to the timestamps.

19. The method of claim 1 further comprising:
generating a pickup packet automatically, including at least:
automatically collecting, for a specific user, notes regarding the recorded audio of speech generated from reading of the manuscript; and
generating, for the specific user, an electronic report with text of the notes included in the report and also audio snippets from the recorded audio associated with each of the notes for reference purposes.

20. The method of claim 1 further comprising:
electronically presenting, via a graphical user interface, a configuration form for pause editing and pacing of the recorded audio of speech generated from reading of the manuscript wherein the configuration form presents selectable options for a user to select durations for different possible punctuation and dialog settings for pauses and pacing;
receiving input indicating selections via the configuration form of durations for different possible punctuation or dialog settings for pauses or pacing; and
editing, based on the received input, pausing or pacing of the recorded audio.

21. The method of claim 1 further comprising:
electronically detecting and flagging non-speech sounds in the recorded audio for editing by a user within a scripted audio production application.

22. The method of claim 1 further comprising:
before the reading of the manuscript by the narrator:
automatically extracting from the manuscript words detected to likely be mispronounced by the narrator during the reading of the manuscript;
listing the detected words in a graphical user interface of a scripted audio production application;
electronically consulting existing pronunciation dictionaries or other resources to collect information that helps identify proper pronunciation of the detected words; and
electronically communicating to the narrator, via the graphical user interface or a separate electronic document, the collected information that helps identify proper pronunciation of the detected words.

23. A method for scripted audio production, the method comprising:
electronically receiving a manuscript;
electronically storing the manuscript; and
for each portion of a plurality of portions of recorded audio of speech generated from reading of the manuscript by a narrator:
electronically determining to which particular portion of the manuscript the portion of recorded audio corresponds;
determining whether a discrepancy exists between the portion of the manuscript and the portion of the recorded audio based on the determination of to which portion of the manuscript the portion of recorded audio corresponds, wherein the determining whether the discrepancy exists between the portion of the manuscript and the portion of the recorded audio includes performing Time Alignment with a CTC-trained model with one or more of: root mean square (RMS) and Voice Activity Detector (VAD) detection loss, wherein the performing Time Alignment with a CTC-trained model with one or more of: RMS and VAD detection loss includes:
introducing a second loss term during a CTC training process, which encourages a machine learning (ML) model to align resulting silent or blank logits with silent sections in audio used in a CTC training process; and
electronically determining whether to perform an action based on the determination whether the discrepancy exists between the portion of the manuscript and the portion of the recorded audio.

24. A method for scripted audio production, the method comprising:
electronically receiving a manuscript;
electronically storing the manuscript; and
for each portion of a plurality of portions of recorded audio of speech generated from reading of the manuscript by a narrator:

electronically determining to which particular portion of the manuscript the portion of recorded audio corresponds;
determining whether a discrepancy exists between the portion of the manuscript and the portion of the recorded audio based on the determination of to which portion of the manuscript the portion of recorded audio corresponds, wherein the determining whether the discrepancy exists between the portion of the manuscript and the portion of the recorded audio includes performing reverse normalization of the manuscript and the recorded audio, wherein the performing reverse normalization includes:
performing text normalization by selecting a single most likely normalization of text for one or more sentences in the portion of the manuscript and producing normalized text based on the selected single most likely normalization;
running a proofing process against the normalized text and the and the portion of the recorded audio;
looking at all places where the proofing process reported an error and in which the error was in a place where text normalization had been applied; and
selecting a single most likely representation of the portion of the recorded audio based on a logit probability distribution that is a result of a Connectionist Temporal Classification (CTC)-trained model used for alignment of text of the manuscript.

25. A non-transitory computer-readable storage medium having computer-executable instructions stored thereon that, when executed by one or more processors, cause a system for scripted audio production to perform operations, the operations including:
electronically receiving a manuscript;
electronically storing the manuscript; and
for each portion of a plurality of portions of recorded audio of speech generated from reading of the manuscript by a narrator:
electronically determining to which particular portion of the manuscript the portion of recorded audio corresponds;
determining whether a discrepancy exists between the portion of the manuscript and the portion of the recorded audio based on the determination of which portion of the manuscript the portion of recorded audio corresponds, wherein the determining whether the discrepancy exists between the portion of the manuscript and the portion of the recorded audio includes performing Time Alignment with a CTC-trained model with one or more of: root mean square (RMS) and Voice Activity Detector (VAD) detection loss, wherein the performing Time Alignment with a CTC-trained model with one or more of: RMS and VAD detection loss includes:
introducing a second loss term during a CTC training process, which encourages a machine learning (ML) model to align resulting silent or blank logits with silent sections in audio used in a CTC training process; and
electronically determining whether to perform an action based on the determination whether the discrepancy exists between the portion of the manuscript and the portion of the recorded audio.

26. The non-transitory computer-readable storage medium of claim 25 wherein the action is one or more of: flagging the discrepancy, providing a notification regarding the discrepancy and providing one or more options to a user to take an action regarding the discrepancy.

27. The non-transitory computer-readable storage medium of claim 25 wherein the instructions, when executed by the one or more processors, further cause the system to perform operations including at least:
electronically receiving input indicating to initiate recording of the audio of speech generated from reading of the manuscript; and
in response to the input, starting to electronically record the audio of speech, wherein:
the determining to which portion of the manuscript the portion of recorded audio corresponds includes:
in response to starting to electronically record the audio of speech, while recording the audio of speech, electronically determining to which portion of the manuscript a portion of the audio currently being recorded corresponds;
the determining whether the discrepancy exists between the portion of the manuscript and the portion of the recorded audio includes:
while recording the audio of speech, automatically determining whether the discrepancy exists between the portion of the manuscript and the portion of the audio currently being recorded based on the determination of to which particular portion of the manuscript a portion of the audio currently being recorded corresponds; and
the electronically determining whether to perform an action based on the determination whether the discrepancy exists between the portion of the manuscript and the portion of the recorded audio includes:
electronically determining whether to perform an action based on the automatic determination of whether the discrepancy exists between the portion of the manuscript and the portion of the audio currently being recorded.

28. The non-transitory computer-readable storage medium of claim 27 wherein the instructions, when executed by the one or more processors, further cause the system to perform operations including at least:
while recording the audio of speech, in response to determining the discrepancy exists between the portion of the manuscript and the portion of the audio currently being recorded, automatically communicating an indication of the discrepancy to be visible by one reading the manuscript.

29. The non-transitory computer-readable storage medium of claim 25 wherein the action is presenting an indication of the discrepancy and the instructions, when executed by the one or more processors, further causing the system to perform operations including at least:
electronically presenting indications of discrepancies between the manuscript and corresponding portions of the recorded audio.

30. The non-transitory computer-readable storage medium of claim 25 wherein the instructions, when executed by the one or more processors, further cause the system to perform operations including at least:
automatically detecting in the recorded audio of speech individual portions of audio that represent portions of the manuscript that were repeated by a reader of the manuscript to correct a mistake in the reading of the manuscript;

electronically selecting one of the individual portions of audio that represent portions of the manuscript that were repeated; and automatically generating an edited version of the recorded audio of speech generated from reading of the manuscript in which the selected individual portion is included instead of the other individual portions of audio that represent portions of the manuscript that were repeated.

31. The non-transitory computer-readable storage medium of claim 30 wherein the selecting one of the individual portions of audio includes:

electronically presenting a menu of the individual portions from which a user may select; and receiving input indicative of a selection from the menu of one of the individual portions of audio as the selected individual portion.

32. The non-transitory computer-readable storage medium of claim 25 wherein the determining whether the discrepancy exists between the portion of the manuscript and the portion of the recorded audio further includes comparing an automatic transcription of a record directly to the manuscript.

33. The non-transitory computer-readable storage medium of claim 25 wherein the determining whether the discrepancy exists between the portion of the manuscript and the portion of the recorded audio includes performing document heuristics to remove extra text from the manuscript, wherein the extra text includes one or more of: page numbers, headers, footers and footnotes.

34. The non-transitory computer-readable storage medium of claim 25 wherein the determining whether the discrepancy exists between the portion of the manuscript and the portion of the recorded audio includes performing text alignment of text from the manuscript with text resulting from automatic speech recognition (ASR) of the recorded audio of speech generated from reading of the manuscript.

35. The non-transitory computer-readable storage medium of claim 25 wherein the determining whether the discrepancy exists between the portion of the manuscript and the portion of the recorded audio includes performing context aware CTC logit resizing for automatic speech recognition (ASR) ensembles.

36. The non-transitory computer-readable storage medium of claim 25 wherein the determining whether the discrepancy exists between the portion of the manuscript and the portion of the recorded audio includes performing an alignment method to improve teacher-training of audio models.

37. The non-transitory computer-readable storage medium of claim 25 wherein the determining whether the discrepancy exists between the portion of the manuscript and the portion of the recorded audio includes performing grapheme-to-phoneme pronunciation equivalence.

38. The non-transitory computer-readable storage medium of claim 25 wherein the determining whether the discrepancy exists between the portion of the manuscript and the portion of the recorded audio includes performing reverse normalization of the manuscript and the recorded audio, wherein the performing reverse normalization includes:

performing text normalization by selecting a single most likely normalization of text for one or more sentences in the portion of the manuscript and producing normalized text based on the selected single most likely normalization;

running a proofing process against the normalized text and the and the portion of the recorded audio;

looking at all places where the proofing process reported an error and in which the error was in a place where text normalization had been applied; and selecting a single most likely representation of the portion of the recorded audio based on a logit probability distribution that is a result of a Connectionist Temporal Classification (CTC)-trained model used for alignment of text of the manuscript.

39. The non-transitory computer-readable storage medium of claim 25 wherein the computer-executable instructions, when executed by the one or more processors, further cause the system to perform operations including at least:

presenting a graphical user interface that combines a view of: an audio player that plays the recorded audio, the manuscript and an interface for entering and editing error notes all in a same user interface screen of a single scripted audio production application.

40. The non-transitory computer-readable storage medium of claim 25 wherein the computer-executable instructions, when executed by the one or more processors, further cause the system to perform operations including at least:

presenting a graphical user interface within a scripted audio production application that visually synchronizes text of the manuscript with corresponding portions of the recorded audio of speech generated from reading of the manuscript.

41. The non-transitory computer-readable storage medium of claim 25 wherein the computer-executable instructions, when executed by the one or more processors, further cause the system to perform operations including at least:

starting to record audio of speech generated from reading of the manuscript by the narrator;

in response to starting to record the audio of the speech, automatically tracking a current point within the manuscript from where the narrator is currently reading while recording the audio generated from reading of the manuscript; and during the reading of the manuscript, automatically highlighting or otherwise indicating via a user interface, discrepancies between the text of the manuscript and corresponding portions of the speech generated from reading of the manuscript.

42. The non-transitory computer-readable storage medium of claim 25 wherein the computer-executable instructions, when executed by the one or more processors, further cause the system to perform operations including at least:

receiving input indicating selection via a graphical user interface of a word in the manuscript; and in response to receiving the input indicating the selection the word, outputting for presentation via the graphical user interface a timestamp within the recorded audio corresponding to a recording of the word during reading of the manuscript.

43. The non-transitory computer-readable storage medium of claim 25 wherein the computer-executable instructions, when executed by the one or more processors, further cause the system to perform operations including at least:

pre-filling into an electronic document, one or more of: timestamps within the recorded audio corresponding to locations within the manuscript and page numbers of the manuscript corresponding to the timestamps.

44. The non-transitory computer-readable storage medium of claim 25 wherein the computer-executable instructions, when executed by the one or more processors, further cause the system to perform operations including at least:
  generating a report automatically, including at least:
    automatically collecting, for a specific user, notes regarding the recorded audio of speech generated from reading of the manuscript; and
    generating, for the specific user, an electronic report with text of the notes included in the report and also audio snippets from the recorded audio associated with each of the notes for reference purposes.

45. The non-transitory computer-readable storage medium of claim 25 wherein the computer-executable instructions, when executed by the one or more processors, further cause the system to perform operations including at least:
  electronically presenting, via a graphical user interface, a configuration form for pause editing and pacing of the recorded audio of speech generated from reading of the manuscript wherein the configuration form presents selectable options for a user to select durations for different possible punctuation and dialog settings for pauses and pacing;
  receiving input indicating selections via the configuration form of durations for different possible punctuation or dialog settings for pauses or pacing; and
  editing, based on the received input, pausing or pacing of the recorded audio.

46. The non-transitory computer-readable storage medium of claim 25 wherein the computer-executable instructions, when executed by the one or more processors, further cause the system to perform operations including at least:
  electronically detecting and flagging non-speech sounds in the recorded audio for editing by a user within a scripted audio production application.

47. The non-transitory computer-readable storage medium of claim 25 wherein the computer-executable instructions, when executed by the one or more processors, further cause the system to perform operations including at least:
  before the reading of the manuscript by the narrator:
    automatically extracting from the manuscript words detected to likely be mispronounced by the narrator during the reading of the manuscript;
    listing the detected words in a graphical user interface of a scripted audio production application;
    electronically consulting existing pronunciation dictionaries or other resources to collect information that helps identify proper pronunciation of the detected words; and
    electronically communicating to the narrator, via the graphical user interface or a separate electronic document, the collected information that helps identify proper pronunciation of the detected words.

48. A non-transitory computer-readable storage medium having computer-executable instructions stored thereon that, when executed by one or more processors, cause a system for scripted audio production to perform operations, the operations including:
  electronically receiving a manuscript;
  electronically storing the manuscript; and
  for each portion of a plurality of portions of recorded audio of speech generated from reading of the manuscript by a narrator:
    electronically determining to which particular portion of the manuscript the portion of recorded audio corresponds;
    determining whether a discrepancy exists between the portion of the manuscript and the portion of the recorded audio based on the determination of to which portion of the manuscript the portion of recorded audio corresponds, wherein the determining whether the discrepancy exists between the particular portion of the manuscript and the portion of the recorded audio includes alignment of text of the manuscript and a logit probability distribution that is a result of a Connectionist Temporal Classification (CTC)-trained model; and
    electronically determining whether to perform an action based on the determination whether the discrepancy exists between the portion of the manuscript and the portion of the recorded audio.

* * * * *